United States Patent
Norkin

(10) Patent No.: US 10,575,021 B2
(45) Date of Patent: Feb. 25, 2020

(54) CONTROLLING DEBLOCKING FILTERING

(71) Applicant: TELEFONAKTIEBOLAGET L M ERICSSON (PUBL), Stockholm (SE)

(72) Inventor: Andrey Norkin, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1016 days.

(21) Appl. No.: 14/412,830

(22) PCT Filed: Jun. 30, 2013

(86) PCT No.: PCT/SE2013/050832
§ 371 (c)(1),
(2) Date: Jan. 5, 2015

(87) PCT Pub. No.: WO2014/007735
PCT Pub. Date: Jan. 9, 2014

(65) Prior Publication Data
US 2015/0146795 A1    May 28, 2015

Related U.S. Application Data

(60) Provisional application No. 61/667,501, filed on Jul. 3, 2012.

(51) Int. Cl.
| | | |
|---|---|---|
| H04N 19/86 | (2014.01) | |
| H04N 19/182 | (2014.01) | |
| H04N 19/119 | (2014.01) | |
| H04N 19/126 | (2014.01) | |
| H04N 19/80 | (2014.01) | |

(52) U.S. Cl.
CPC .......... H04N 19/86 (2014.11); H04N 19/119 (2014.11); H04N 19/126 (2014.11); H04N 19/182 (2014.11); H04N 19/80 (2014.11)

(58) Field of Classification Search
CPC .... H04N 19/176; H04N 19/117; H04N 19/82; H04N 19/86
(Continued)

(56) References Cited

U.S. PATENT DOCUMENTS

| | | | | |
|---|---|---|---|---|
| 5,552,832 A | * | 9/1996 | Astle | ............... H04N 19/176 375/240.24 |
| 2004/0247034 A1 | * | 12/2004 | Zhong | ............... H04N 19/42 375/240.29 |

(Continued)

FOREIGN PATENT DOCUMENTS

JP    2008193548 A    8/2008

OTHER PUBLICATIONS

T. Wiegand, W.J. Han, B. Bross, J.R. Ohm, G.J. Sullivan, "High efficiency video coding (HEVC) text specification draft 6," JCT-VC 8th Meeting, JCTVC-H1003, Feb. 2012.*

(Continued)

Primary Examiner — Sath V Perungavoor
Assistant Examiner — Daniel Chang
(74) Attorney, Agent, or Firm — Rothwell, Figg, Ernst & Manbeck, P.C.

(57) ABSTRACT

Pixel values of pixels (12, 14, 16, 22, 24, 26) in a line (15) of pixels (12, 14, 16, 18, 22, 24, 26, 28) are filtered with a strong deblocking filter to obtain filtered pixel values. Each filtered pixel value is clipped off to a respective clipping parameter value defined based on a position of the pixel (12, 14, 16, 22, 24, 26) relative to a block boundary (2) between two adjacent blocks (10, 20) of pixels (12, 14, 16, 18, 22, 24, 26, 28). The clipping parameter values change at least linearly depending in the pixel position relative to the block boundary (2) so that pixels (12, 16) in the line (15) of pixels (12, 14, 16, 18, 22, 24, 26, 28) having different positions from the block boundary (2) will have different clipping parameter values.

25 Claims, 8 Drawing Sheets

(58) Field of Classification Search
USPC .................. 375/240.02, 240.12, 240.29
See application file for complete search history.

(56) References Cited

U.S. PATENT DOCUMENTS

| | | | | |
|---|---|---|---|---|
| 2005/0053137 | A1* | 3/2005 | Holcomb | H04N 19/52 375/240.16 |
| 2006/0133689 | A1 | 6/2006 | Andersson et al. | |
| 2007/0269129 | A1* | 11/2007 | Kempf | H04N 5/208 382/268 |
| 2008/0050033 | A1* | 2/2008 | Lin | H04N 19/42 382/268 |

OTHER PUBLICATIONS

Benjamin Bross, "High efficiency video coding (HEVC) text specification draft 7", Joint Collaborative Team on Video Coding (JCT-VC) of ITU-T SG16 WP3 and ISO/IEC JTC1/SC29/WG11 9th Meeting: Geneva, CH, Apr. 27-May 7, 2012, Document JCTVC-I1003_d0, 268 pages.

List, et al., "Adaptive Deblocking Filter", IEEE Transactions on Circuits and Systems for Video Technology, vol. 13, No. 7, Jul. 2003, 6 pages.

Norkin, et al., "Development of HEVC deblocking filter", Joint Collaborative Team on Video Coding (JCT-VC) of ITU-T SG16 WP3 and ISO/IEC JTC1/SC29/WG11, 4th meeting, Deagu, Korea, Jan. 20-28, 2011, document: JCTVC-D377, WG11 No. m19154, 4 pages.

Communication pursuant to Article 94(3) EPC issued in EP 13 740 072.7 dated Nov. 30, 2015, 7 pages.

Ericsson, "AHG6: On deblocking filter and parameters signalling," Joint Collaborative Team on Video Coding (JCT-VC) of ITU-T SG 16 WP 3 and ISO/IEC JTC 1/SC 29/WG 11, Document JCTVC-L0232_r6, Jan. 2013, 16 pages.

\* cited by examiner

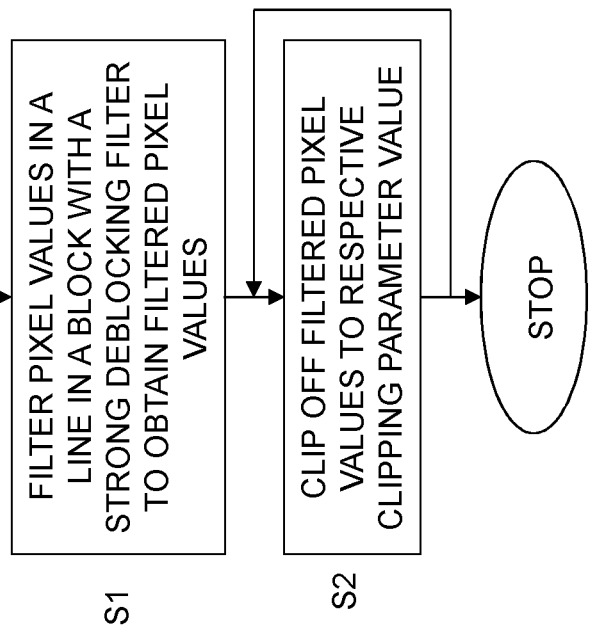
FIG. 9
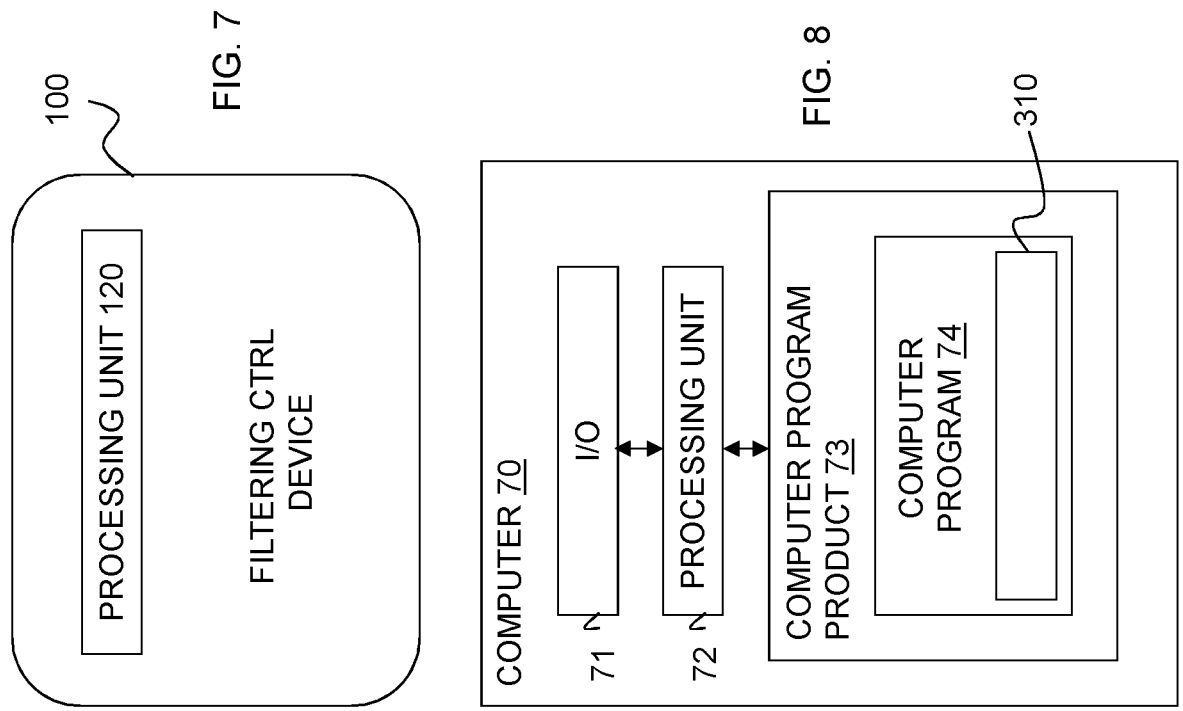
FIG. 7
FIG. 8

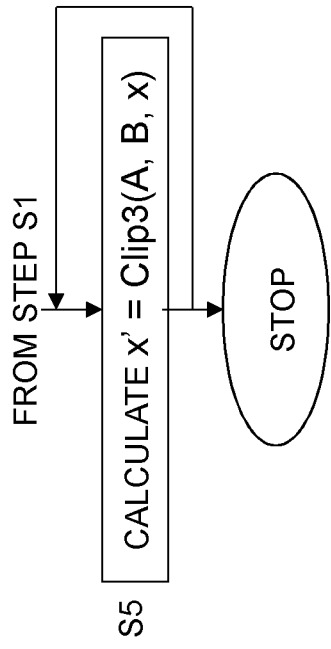
FIG. 10
FIG. 11
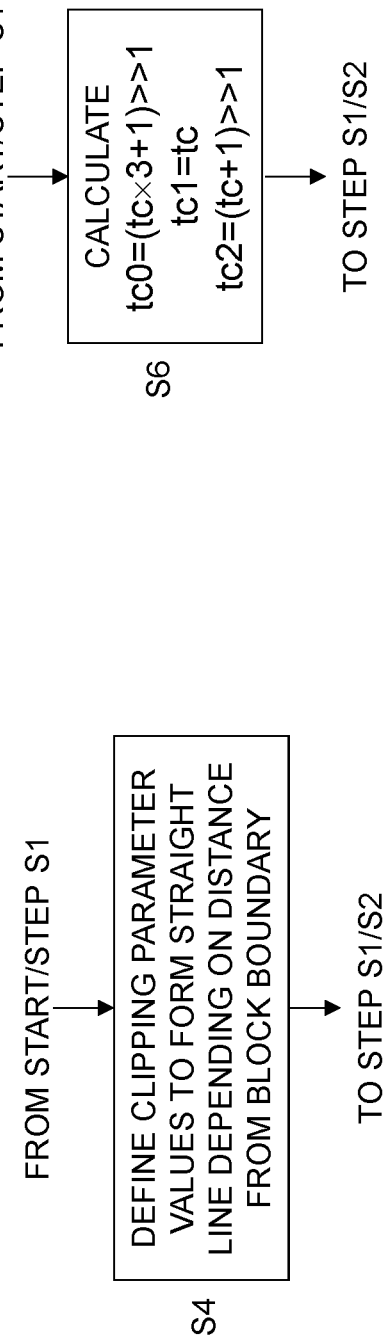
FIG. 12
FIG. 13

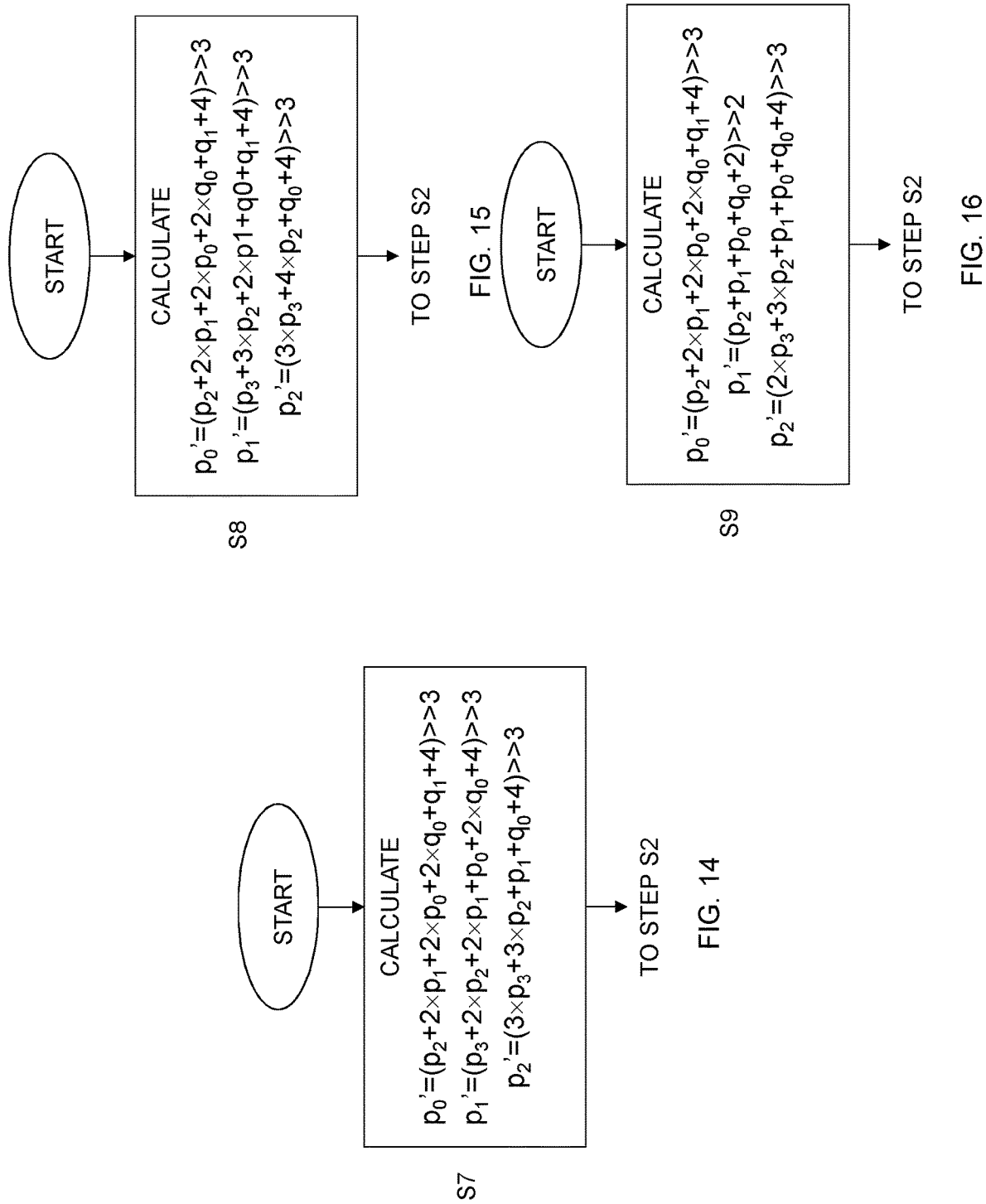

CONTROLLING DEBLOCKING FILTERING

CROSS REFERENCE TO RELATED APPLICATION(S)

This application is a 35 U.S.C. § 371 National Phase Entry Application from PCT/SE2013/050832 filed Jun. 30, 2013, which claims priority to U.S. Provisional Application No. 61/667,501, filed Jul. 3, 2012. The above identified applications are incorporated by reference in their entirety.

TECHNICAL FIELD

The present embodiments generally relate to deblocking filtering and in particular to controlling strong deblocking filtering over a block boundary between adjacent blocks of pixels in a picture.

BACKGROUND

Deblocking filters are used in video coding standards in order to combat blocking artifacts. The blocking artifacts arise because the original video is split into blocks which are processed relatively independently. The blocking artifacts can arise due to different intra prediction of blocks, quantization effects and motion compensation. Two particular variants of deblocking are described below.

These descriptions assume a vertical block boundary. The process is also done in the same way for horizontal block boundaries.

H.264 Deblocking

In state of the art video coding such as H.264 there is an adaptive de-blocking filter/loop filter after prediction and residual reconstruction, but before storage of the reconstruction for later reference when encoding or decoding subsequent frames. The deblocking filtering consists of several steps such as filter decisions, filtering operations, a clipping function and changes of pixel values. The decision to filter the border or not is made based on evaluating several conditions. Filter decisions depend on macro block (MB) type, motion vector (MV) difference between neighboring blocks, whether neighboring blocks have coded residuals and on the local structure of the current and/or neighboring blocks.

The amount of filtering for a pixel depends on the position of that pixel relative to the block boundary and on the quantization parameter (QP) value used for residual coding. Here below a to h represent pixel values across a vertical block boundary.

$abcd|efgh$

The filter decision is based on comparing three pixel differences with three thresholds. The thresholds are adapted to the QP.

If the following conditions are fulfilled the filtering is done:

$abs(d-e) < thr1$, $abs(c-d) < thr2$, and $abs(e-f) < thr2$ where thr1 and thr2 are functions of QP.

There are two filtering modes in H.264. In the first filtering mode (normal filtering), filtering can be described with a delta value that the filtering changes the current pixel value with. The filtering for the pixel closest to the block boundary is:

$d' = d + \text{delta}$ and $e' = e - \text{delta}$ where delta has been clipped off to a threshold $\pm thr3$ to a value that is constrained by the QP. d' is here the pixel value at position d after filtering and e' is the pixel value after filtering at position e. More filtering is allowed for high QP than for low QP.

Clipping can be described as:

delta_clipped=max(-thr3,min(thr3,delta))

where thr3 is controlling the filter strength. A larger value of thr3 means that the filtering is stronger, which in turns means that a stronger low-pass filtering effect will happen.

The filter strength can be increased if any of the following two conditions also holds:

$abs(b-d) < thr2$ and $abs(e-g) < thr2$

The filter strength is adapted by clipping the delta less, e.g. to allow for more variation.

The second filtering mode (strong filtering) is applied for intra macroblock boundaries only, when the following condition is fulfilled:

$abs(d-e) < thr1/4$.

The thresholds thr1, thr2 and thr3 are derived from table lookup using QP as index. Each slice can contain modifications of thr2 and thr3 using slice_beta_offset_div2 and thr1 using slice_alpha_c0_offset_div2. The slice parameters 2×slice_beta_offset_div2 and 2×slice_alpha_c0_offset_div2 are added to the current QP index before table lookup of thr2/thr3 and thr1 respectively.

Deblocking in HEVC Draft

Here below $p_0$ to $p_3$ and $q_0$ to $q_3$ represent pixel values across a vertical block boundary.

$p_3 p_2 p_1 p_0 | q_0 q_1 q_2 q_3$

In the draft HEVC specification, the deblocking filter works differently than H.264. The filtering is performed if at least one of the blocks on the side of the border is intra, or has non-zero coefficients, or the difference between the motion vector components of the blocks is greater than or equal to one integer pixel. For example, if one is filtering the border between the blocks A and B below, then the following condition should satisfy for the block boundary to be filtered:

| A | | | | B | | | |
|---|---|---|---|---|---|---|---|
| $p3_0$ | $p2_0$ | $p1_0$ | $p0_0$ | $q0_0$ | $q1_0$ | $q2_0$ | $q3_0$ |
| $p3_1$ | $p2_1$ | $p1_1$ | $p0_1$ | $q0_1$ | $q1_1$ | $q2_1$ | $q3_1$ |
| $p3_2$ | $p2_2$ | $p1_2$ | $p0_2$ | $q0_2$ | $q1_2$ | $q2_2$ | $q3_2$ |
| $p3_3$ | $p2_3$ | $p1_3$ | $p0_3$ | $q0_3$ | $q1_3$ | $q2_3$ | $q3_3$ |

$dp0 = |p2_0 - 2 \times p1_0 + p0_0|$ $dp3 = |p2_3 - 2 \times p1_3 + p0_3|$ $dq0 = |q2_0 - 2 \times q1_0 + q0_0|$ $dq3 = |q2_3 - 2 \times q1_3 + q0_3|$ $dpq0 = dp0 + dq0$ $dpq3 = dp3 + dq3$ $dp = dp0 + dp3$ $dq = dq0 + dq3$     (1)

The variable d is derived as follows:

$$d = dpq0 + dpq3 \quad (2)$$

The deblocking filtering is performed on the block boundary for lines i=0 . . . 3 if the following condition holds:

$$d < \beta \quad (3)$$

where β depends on QP. In the draft HEVC specification, there is a table, see Table 1 below, for looking up the value of β using QP as the table index. β increases with increasing QP.

TABLE 1

Derivation of threshold variables β and $t_c$ from input QP

| QP | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| β | 0 | 0 | 0 | 0 | 0 | 0 | 0 | 0 | 0 | 0 | 0 | 0 | 0 | 0 | 0 | 0 | 6 | 7 | 8 |
| $t_c$ | 0 | 0 | 0 | 0 | 0 | 0 | 0 | 0 | 0 | 0 | 0 | 0 | 0 | 0 | 0 | 0 | 0 | 0 | 1 |

| QP | 19 | 20 | 21 | 22 | 23 | 24 | 25 | 26 | 27 | 28 | 29 | 30 | 31 | 32 | 33 | 34 | 35 | 36 | 37 |
|---|---|---|---|---|---|---|---|---|---|---|---|---|---|---|---|---|---|---|---|
| β | 9 | 10 | 11 | 12 | 13 | 14 | 15 | 16 | 17 | 18 | 20 | 22 | 24 | 26 | 28 | 30 | 32 | 34 | 36 |
| $t_c$ | 1 | 1 | 1 | 1 | 1 | 1 | 1 | 1 | 2 | 2 | 2 | 2 | 3 | 3 | 3 | 3 | 4 | 4 | 4 |

| QP | 38 | 39 | 40 | 41 | 42 | 43 | 44 | 45 | 46 | 47 | 48 | 49 | 50 | 51 | 52 | 53 | 54 | 55 |
|---|---|---|---|---|---|---|---|---|---|---|---|---|---|---|---|---|---|---|
| β | 38 | 40 | 42 | 44 | 46 | 48 | 50 | 52 | 54 | 56 | 58 | 60 | 62 | 64 | 64 | 64 | 64 | 64 |
| $t_c$ | 5 | 5 | 6 | 6 | 7 | 8 | 9 | 9 | 10 | 10 | 11 | 11 | 12 | 12 | 13 | 13 | 14 | 14 |

If the condition in equation (3) above is fulfilled and filtering is done between blocks A and B, one of two types of filtering (weak or strong filtering) is performed. The choice between the strong and the weak filtering is done separately for each line depending on the following conditions. For lines i=0,3, strong filtering is performed if all the following conditions are true, otherwise, weak filtering is performed:

$$2 \times dpq_i < (\beta >> 2) \quad (4)$$

$$\text{and } (|p3_i - p0_i| + |q0_i - q3_i|) < (\beta >> 3) \quad (5)$$

$$\text{and } |p0_i - q0_i| < ((5 \ast t_c + 1) >> 1), \quad (6)$$

where $t_c$ and β depend on QP as shown in Table 1. The $t_c$ is calculated as $t_c \times (QP+2)$ when A or B has PredMode==MODE_INTRA.

The two filtering modes (weak and strong filtering) in the HEVC draft look like in the following:

Weak Filtering

Weak filtering is performed based on the above conditions. The actual filtering works by computing an offset (Δ) for each of the lines i that the weak filter has been selected for. The following weak filtering procedure is applied for every line, where it has been chosen. In the following algorithm, the variables p0 . . . p2 and q0 . . . q2 are assigned the following values (from row/column i) where $p0=p0_i$, $p1=p1_i$, $p2=p2_i$, $q0=q0_i$, $q1=q_1 i$, $q2=q2_i$. One can see that if the weak filtering is performed, one to two pixels are modified at each side of the block boundary:

$$\Delta = (9 \times (q0 - p0) - 3 \times (q1 - p1) + 8) >> 4$$
if (abs(Δ) < 10 × $t_C$)
{
  Δ = Clip 3(−$t_C$, $t_C$, Δ)
  $p0' = \text{Clip} 1_Y(p0 + \Delta)$
  $q0' = \text{Clip} 1_Y(q0 - \Delta)$ if $(dp < (\beta + (\beta >> 1)) >> 3)$ \quad (7)
{
  Δp = Clip 3(−(tc >> 1), tc >> 1,
  $(((p2 + p0 + 1) >> 1) - p1 + \Delta) >> 1)$
  $p1' = \text{Clip} 1_Y(p1 + \Delta p)$
} if $(dq < (\beta + (\beta >> 1)) >> 3)$ \quad (8)
{
  Δq = Clip 3(−(tc >> 1), tc >> 1,
  $(((q2 + q0 + 1) >> 1) - q1 - \Delta) >> 1)$
  $q1' = \text{Clip} 1_Y(q1 + \Delta q)$
}
} where Clip is defined as x'=Clip3(A, B, x): x'=x or if x<A x'=A or if x>B x'=B and Clip1$_Y$(x)=Clip3(0, (1<<BitDepth$_Y$)−1, x), where BitDepth$_Y$ is the bit depth, for example 8 or 10.

Strong Filtering

Strong filtering mode is performed for a line i of pixels by the following set of operations, where $p0=p0_i$, $p1=p1_i$, $p2=p2_i$, $q0=q0_i$, $q1=q1_i$, $q2=q2_i$:

$p0'=\text{Clip3}(p0-2\times tc, p0+2\times tc, (p2+2\times p1+2\times p0+2\times q0+q1+4)>>3)$ $p1'=\text{Clip3}(p1-2\times tc, p1+2\times tc, (p2+p1+p0+q0+2)>>2)$ $p2'=\text{Clip3}(p2-2\times tc, p2+2\times tc, (2\times p3+3\times p2+p1+p0+q0+4)>>3)$ $q0'=\text{Clip3}(q0-2\times tc, q0+2\times tc, (p1+2\times p0+2\times q0+2\times q1+q2+4)>>3)$ $q1'=\text{Clip3}(q1-2\times tc, q1+2\times tc, (p0+q0+q1+q2+2)>>2)$ $q2'=\text{Clip3}(q2-2\times tc, q2+2\times tc, (p0+q0+q1+3\times q2+2\times q3+4)>>3)$ A shortcoming with the prior art strong deblocking filtering and in particular the clipping operations is that it may result in subjective quality problems. These subjective quality problems include creating a sort of ripple at the block boundary in certain situations, e.g. when the signal on the sides of the block boundary has a skewed line. Hence, there is a need for improvement with regard to strong deblocking filtering and clipping operations.

SUMMARY

It is a general object to provide an improved deblocking filtering control.

It is a particular object to provide an improved clipping function for strong deblocking filtering.

These and other objects are met by embodiment as disclosed herein.

An aspect of the embodiments relates to a filtering control method comprising filtering pixel values of pixels in a line of pixels in a block of pixels with a strong deblocking filter to obtain filtered pixel values. The method also comprises clipping off, for each filtered pixel value of a pixel in the line of pixel, the filtered pixel value to a respective clipping parameter value defined based on a position of the pixel relative to a block boundary between the block of pixels and a neighboring block of pixels. The clipping parameter values change at least approximately linearly depending on the position of the pixel relative to the block boundary and pixels in the line of pixels having different positions from the block boundary have different clipping parameter values.

Another aspect of the embodiments relates to a filtering control device comprising a filtering unit configured to filter pixel values of pixels in a line of pixels in a block of pixels with a strong deblocking filter to obtain filtered pixel values. The filtering control device also comprises a clipping unit configured to clip off, for each filtered pixel value of a pixel in the line of pixel, the filtered pixel value to a respective clipping parameter value defined based on a position of the pixel relative to a block boundary between the block of pixels and a neighboring block of pixels. The clipping parameter values change at least approximately linearly depending on the position of the pixel relative to the block boundary and pixels in the line of pixels having different positions from the block boundary have different clipping parameter values.

A further aspect of the embodiments relates to a filtering control device comprising a processing unit configured to filter pixel values of pixels in a line of pixels in a block of pixels with a strong deblocking filter to obtain filtered pixel values. The processing unit is also configured to clip off, for each filtered pixel value of a pixel in the line of pixel, the filtered pixel value to a respective clipping parameter value defined based on a position of the pixel relative to a block boundary between the block of pixels and a neighboring block of pixels. The clipping parameter values change at least approximately linearly depending on the position of the pixel relative to the block boundary and pixels in the line of pixels having different positions from the block boundary have different clipping parameter values.

Further aspects of the embodiments relate to an encoder comprising a filtering control device according to above, a decoder comprising a filtering control device according to above, a user equipment comprising an encoder and/or a decoder according to above and a network device being or belonging to a network node in a communication network. The network device comprises an encoder and/or a decoder according to above.

Yet another aspect of the embodiments relates to a computer program for filtering control. The computer program comprises code means, which when executed by a processing unit, causes the processing unit to filter pixel values of pixels in a line of pixels in a block of pixels with a strong deblocking filter to obtain filtered pixel values. The code means also causes the processing unit to clip off, for each filtered pixel value of a pixel in the line of pixel, the filtered pixel value to a respective clipping parameter value defined based on a position of the pixel relative to a block boundary between the block of pixels and a neighboring block of pixels. The clipping parameter values change at least approximately linearly depending on the position of the pixel relative to the block boundary and pixels in the line of pixels having different positions from the block boundary have different clipping parameter values.

A related aspect relates to a computer program product comprising computer readable code means and a computer program according to above stored on the computer readable code means.

A further embodiment relates to a media terminal comprising a processing unit and a memory comprising code means executable by the processing unit. The media terminal is thereby operative to filter pixel values of pixels in a line of pixels in a block of pixels with a strong deblocking filter to obtain filtered pixel values. The media terminal is also operative to clip off, for each filtered pixel value of a pixel in the line of pixel, the filtered pixel value to a respective clipping parameter value defined based on a position of the pixel relative to a block boundary between the block of pixels and a neighboring block of pixels. The clipping parameter values change at least approximately linearly depending on the position of the pixel relative to the block boundary and pixels in the line of pixels having different positions from the block boundary have different clipping parameter values.

The proposed solution improves the subjective and/or objective quality of strong deblocking filtering. Usage of unequal clipping and/or the proposed filtering prevents artifacts, such as a ripple or wave, from appearing at the block boundary.

BRIEF DESCRIPTION OF THE DRAWINGS

The embodiments, together with further objects and advantages thereof, may best be understood by making reference to the following description taken together with the accompanying drawings, in which:

FIG. 6 is a schematic block diagram of a network node in a communication network according to an embodiment;

FIG. 7 is a schematic block diagram of a filtering control (ctrl) device according to an embodiment;

FIG. 8 is a schematic block diagram of a computer according to an embodiment;

FIG. 9 is a flow diagram of a filtering control method according to an embodiment;

FIG. 10 is a flow diagram illustrating an additional, optional step of the filtering control method in FIG. 9 according to an embodiment;

FIG. 11 is a flow diagram illustrating an additional, optional step of the filtering control method in FIG. 9 according to an embodiment;

FIG. 12 is a flow diagram illustrating an implementation embodiment of the clipping off step in FIG. 9;

FIG. 13 is a flow diagram illustrating an additional, optional step of the filtering control method in FIG. 9 according to an embodiment;

FIG. 14 is a flow diagram illustrating an implementation embodiment of the filtering step in FIG. 9;

FIG. 15 is a flow diagram illustrating another implementation embodiment of the filtering step in FIG. 9;

FIG. 16 is a flow diagram illustrating a further implementation embodiment of the filtering step in FIG. 9;

DETAILED DESCRIPTION

Figure 1:
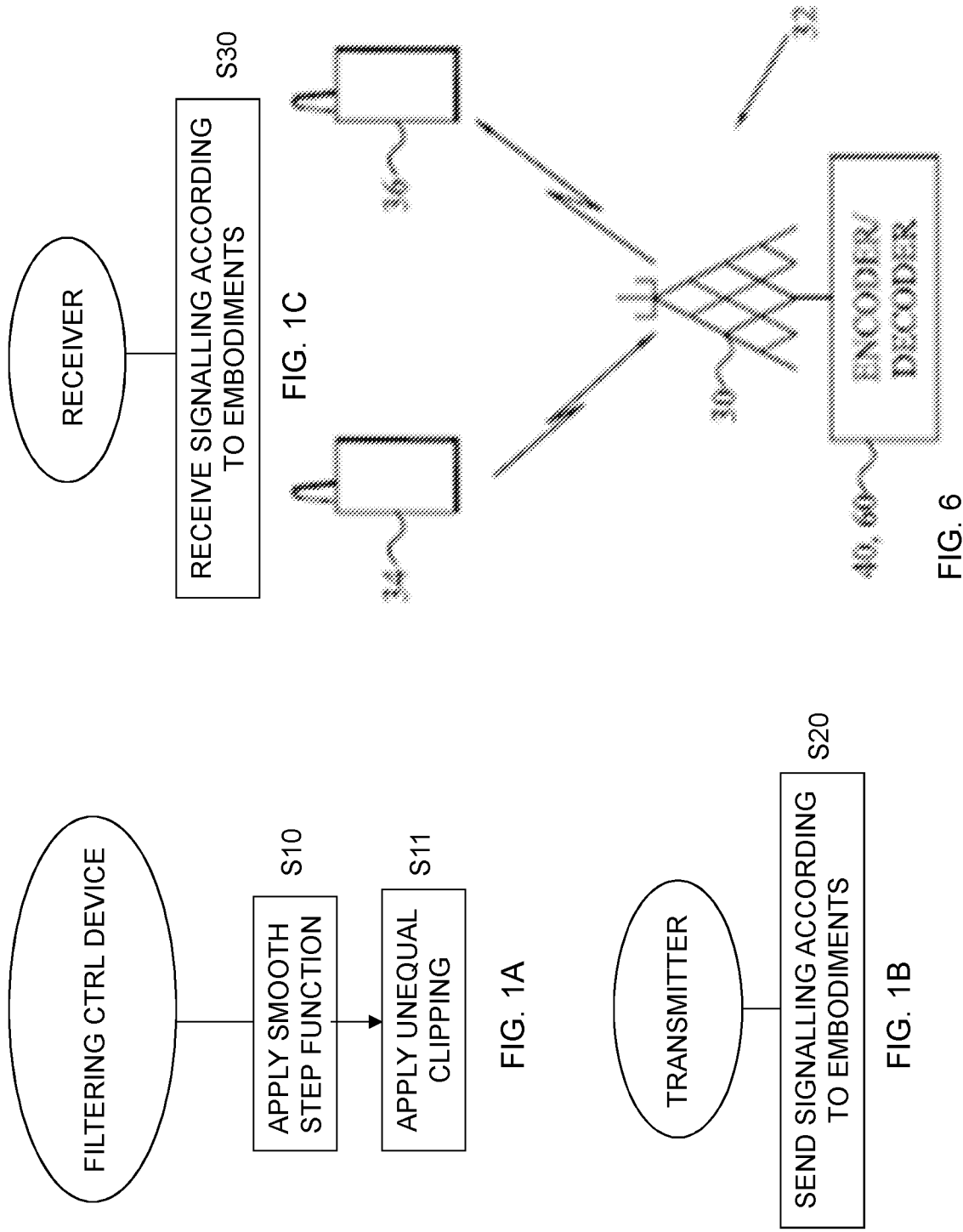
FIGS. 1A-1C illustrate embodiments of methods performed in a filtering control (ctrl) device, a transmitter and a receiver, respectively.

Throughout the drawings, the same reference numbers are used for similar or corresponding elements.

The present embodiments generally relate to deblocking filtering, and in particular to controlling deblocking filtering over a block boundary or border between adjacent blocks of pixels in a picture.

Deblocking filters are used to combat blocking artifacts that arise because the pictures in the original video are split into blocks of pixels, which are processed relatively independently. Deblocking filters are often divided into two types or modes of filtering, generally denoted weak filtering and strong filtering. A strong filter applies, which its name indicate, a stronger filtering of pixel values as compared to a weak filter.

Deblocking filtering involves filtering decision, i.e. determining whether pixel values should be filtered at all and if so, whether strong or weak deblocking filtering should be used; the actual filtering operation and a clipping function that clips the filtered pixel values to be within an allowed pixel value range, i.e. not smaller than a minimum allowed pixel value and not larger than a maximum allowed pixel value.

The prior art clipping function employed for strong deblocking filtering and the strong filter function, as represented by the HEVC strong filtering in the background section, may result in subjective quality problems by causing a sort of ripple at the block boundary between adjacent blocks of pixels. A main reason for this problem is that the prior art clipping function applies the same modification, i.e. clipping parameter value, to the pixels regardless of their positions relative to the block boundary. This same modification is 2×tc. The HEVC strong deblocking filter also has a tendency to create a ripple on the signal of some shapes, e.g. then the signal has a form of the inclined ramp crossing the block boundary.

According to the embodiments, an unequal clipping for the strong deblocking filter is introduced. It means that pixels, sometimes denoted samples in the art of deblocking filtering, having different positions from the block boundary have different maximum modification values.

Hence, the embodiments solve the problems of the prior art by using clipping parameter values that change at least approximately linearly depending on the position of a pixel relative to a block boundary. This further implies that pixels in a line of pixels having different positions from the block boundary have different clipping parameter values, i.e. different maximum modification values.

FIG. 9 is a flow diagram of a filtering control method according to an embodiment, also referred to as a filtering method herein. The method starts in step S1, which comprises filtering pixel values of pixels in a line of pixels in a block of pixels with a strong deblocking filter to obtain filtered pixel values. A next step S2 comprises clipping off, for each filtered pixel value of a pixel in the line of pixels, the filtered pixel value to a respective clipping parameter value. This clipping parameter value is defined based on a position of the pixel relative to a block boundary between the block of pixels and a neighboring block of pixels. The clipping parameter values change at least approximately linearly depending on the position of the pixel relative to the block boundary. Accordingly, pixels in the line of pixels having different positions from the block boundary have different clipping parameter values.

Figure 20:
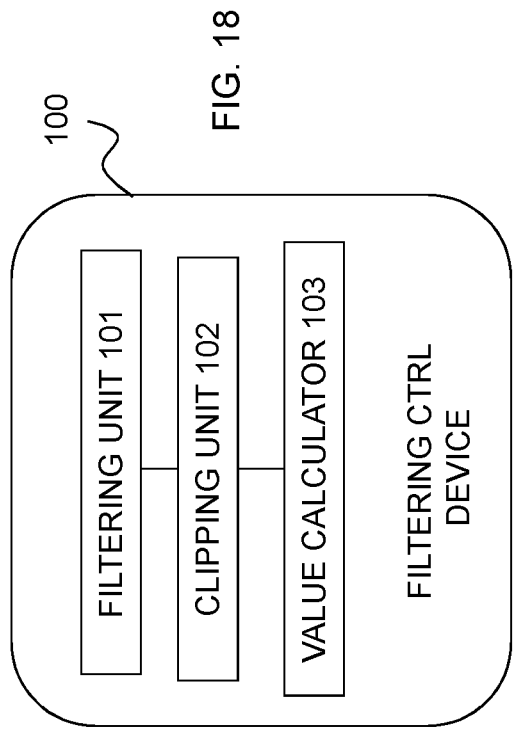
FIG. 20 is a schematic illustration of a picture comprising blocks of pixels.

FIG. 20 schematically illustrates a picture 1, e.g. a picture 1 of a video sequence, in which the pixels 12, 14, 16, 18, 22, 24, 26, 28 have been divided into blocks 10, 20 of pixels 12, 14, 16, 18, 22, 24, 26, 28. The figure also shows a block boundary or border 2 between the block 10 of pixels 12, 14, 16, 18 and its neighboring block 20 of pixels 22, 24, 26, 28. Hence, the block 10 of pixels 12, 14, 16, 18 and the neighboring block 20 of pixels 22, 24, 26, 28 are two adjacent blocks 10, 20 of pixels 12, 14, 16, 18, 22, 24, 26, 28 in the picture 1 and are separated by the block boundary 2. FIG. 20 illustrates the case where the two blocks 10, 20 of pixels 12, 14, 16, 18, 22, 24, 26, 28 are positioned next to each other in the picture 1 and the block boundary 2 therefore is a vertical block boundary. In an alternative approach, the two blocks 10, 20 of pixels 12, 14, 16, 18, 22, 24, 26, 28 are positioned in the picture 1 with one of the blocks 10, 20 of pixels 12, 14, 16, 18, 22, 24, 26, 28 positioned above the other block of pixels. In this alternative approach the block boundary 2 is a horizontal block boundary.

In the art, filtering pixel values of pixels in a line of pixels in a block of pixels are sometimes denoted as filtering sample values of samples in a line of samples in a block of samples. Herein, pixel values and pixels are used throughout the description but also encompass alternative notations used in the art, such as sample values and samples. A pixel value (sample value) generally represents a color value of the pixel (sample). Different color formats are available in the art including luminance+chrominance, red+green+blue (RGB). Video coding generally use the color format with one luminance component and two chrominance components for each pixel. Traditionally, luminance component filtering and chrominance component filtering are done separately possibly employing different filtering decisions and different de-blocking filters. The embodiments can be applied to filter the luminance component, filter the chrominance component or filter both the luminance component and the chrominance component. In a particular embodiment, the embodiments are applied to achieve luminance or luma filtering. Hence, in a particular embodiment a pixel value (sample value) represents a luminance value.

Step S1 of FIG. 9 comprises filtering pixel values of pixels 12, 14, 16 in a line 15 of pixels 12, 14, 16, 18, 22, 24, 26, 28 in a (current) block 10 of pixels 12, 14, 16, 18 with a strong deblocking filter to obtain filtered pixel values. This line 15 of pixels 12, 14, 16, 18, 22, 24, 26, 28 is either a row of pixels 12, 14, 16, 18, 22, 24, 26, 28 as shown in FIG. 20 for a vertical block boundary 2 or a column of pixels 12, 14, 16, 18, 22, 24, 26, 28 for a horizontal block boundary. The row or column 15 of pixels 12, 14, 16, 18, 22, 24, 26, 28 extend across the vertical or horizontal block boundary 2 to pass over and encompass both pixels 12, 14, 16, 18 in the block 10 of pixels 12, 14, 16, 18 and pixels 22, 24, 26, 28 in the neighboring block 20 of pixels 22, 24, 26, 28.

The result of the filtering with the strong deblocking filter, or more correct with a set of strong deblocking filter as is further disclosed herein, in step S1 is filtered pixel values. Hence, the strong filtering as applied in step S1 typically changes the pixel values of the filtered pixels 12, 14, 16 into changed or filtered pixel values.

These filtered pixel values are then clipped off in step S2 to be within a respective allowed pixel value range. Such clipping off is performed by using a respective clipping parameter value for each filtered pixel value. In clear contrast to the prior art, the clipping parameter values applied for strong deblocking filtering are, according to the embodiments, defined based on the position of the pixel 12, 14, 16 relative to the block boundary 2. Accordingly, the clipping parameter values for the filtered pixel values change at least approximately linearly depending on the position of the pixel 12, 14, 16 relative to the block boundary 2. This means that pixels 12, 14, 16 in the line 15 of pixels 12, 14, 16, 18, 22, 24, 26, 28 having different positions from the block boundary 2 have different clipping parameter values. The clipping in step S2 is preferably performed for each filtered pixel value obtained in step S1, which is schematically illustrated by the loop in FIG. 9. In such a case, the clipping parameter value to use in the clipping operation in step S2 is based on and depends on the position of the current pixel 12, 14, 16 in the line 15 of pixels 12, 14, 16, 18, 22, 24, 26, 28 relative to the block boundary 2. Hence, the clipping parameter value is a function of pixel position relative to the block boundary 2, i.e. a function of the distance between the pixel position and the block boundary 2.

For instance, assume that tc0 indicates the clipping parameter value for the first pixel 12, relative to the block boundary 2, in the line 15 of pixels 12, 14, 16, 18, 22, 24, 26, 28 in the block 10 of pixels 12, 14, 16, 18; tc1 indicates the clipping parameter value for the second pixel 14, relative to the block boundary 2, in the line 15 of pixels 12, 14, 16, 18, 22, 24, 26, 28 in the block 10 of pixels 12, 14, 16, 18; and tc2 indicates the clipping parameter value for the third pixel 16, relative to block boundary 2, in the line 15 of pixels 12, 14, 16, 18, 22, 24, 26, 28 in the block 10 of pixels 12, 14, 16, 18. In such a case, tc0≠tc1≠tc2.

In a particular embodiment, pixels 16 that are further away from the block boundary 2 are allowed smaller modifications than the pixels 12 that are closer to the block boundary 2. This enables controlling the strength of deblocking filtering with clipping at the same time making sample on the two sides of the block boundary 2 converge to the middle. This is not always possible if the uniform clipping of the prior art is applied.

FIG. 10 is a flow diagram illustrating an additional, optional step of the filtering control method according to this particular embodiment. The method continues from step S1 in FIG. 9 or starts at step S3. This step S3 comprises defining the clipping parameter values so that a pixel 16 in the line 15 of pixels 12, 14, 16, 18, 22, 24, 26, 28 further away from the block boundary 2 has a smaller clipping parameter value than another pixel 12 in the line 15 of pixels 12, 14, 16, 18, 22, 24, 26, 28 closer to the block boundary 2. Hence, in this embodiment tc0>tc1>tc2. The method then continues to step S1 or S2 of FIG. 9 where the clipping parameter values defined in step S3 are used to clip off filtered pixel values.

In an embodiment, it is proposed to use values of the clipping parameter that change linearly or approximately linearly depending on the position of the sample, i.e. pixel 12, 14, 16, from the block boundary 2. For example, the values of the clipping parameter may form a straight line depending on the distance of the sample from the block boundary 2.

FIG. 11 is a flow diagram illustrating an additional, optional step of the filtering control method according to this embodiment. The method continues from step S1 in FIG. 9 or starts at step S4. This step S4 comprises defining the clipping parameter values to form a straight line depending on a distance of the pixel 12, 14, 16 from the block boundary 2. The method then continues to step S1 or S2 of FIG. 9 where the clipping parameter values defined in step S4 are used to clip off filtered pixel values.

Thus, in this embodiment the clipping parameter values are defined to form a straight line when traveling along the line 15 of pixels 12, 14, 16, 18, 22, 24, 26, 28 from the block boundary 2. In addition, since the clipping parameter values change at least approximately linearly depending on pixel position relative to the block boundary 2 as defined in the foregoing and pixels 12, 14, 16 with different pixel positions have different clipping parameter values, the straight line is in the form of a ramp or gradient, i.e. has a slope different from zero. In a particular embodiment, the clipping parameter values can be defined as tc=k×px+m, wherein px represents the position of a pixel 12, 14, 16 in the line 15 of pixels 12, 14, 16, 18, 22, 24, 26, 28 relative to the block boundary 2, k is a non-zero value and m is zero or a positive or negative value. In a particular embodiment, the sign of k is set so that a pixel 12 having a position closer to the block boundary 2 in the line 15 of pixels 12, 14, 16, 18, 22, 24, 26, 28 has a larger clipping parameter value than another pixel 16 having a position further away from the block boundary 2 in the line 15 of pixels 12, 14, 16, 18, 22, 24, 26, 28 and where the pixel 12 and the another pixel 16 are present in the block 10 of pixels 12, 14, 16, 18.

FIG. 12 is a flow diagram illustrating a particular implementation example of the clipping step S2 of FIG. 9. The method continues from step S2 of FIG. 9. A next step S5 comprises calculating, for each filtered pixel value, a clipped filtered pixel value x'=Clip3(A, B, x) defined as x'=x, or if x<A then x'=A, or if x>B then x'=B. In this case, x denotes the filtered pixel value of the pixel 12, 14, 16, A=$p_x$−tcX and B=$p_x$+tcX, $p_x$ denotes the pixel value of the pixel 12, 14, 16 and tcX denotes the clipping parameter value defined or selected for the pixel 12, 14, 16.

Step S5 is preferably performed for each filtered pixel value in the line 15 of pixels 12, 14, 16, 18, 22, 24, 26, 28, which is schematically illustrated by the loop as shown in FIG. 12. In such a case, the value of tcX will be different for different pixels in the line 15 of pixel 12, 14, 16, 18, 22, 24, 26, 28 in the current block 10 of pixels 12, 14, 16, 18.

An example of a straight line for the clipping parameter values is the following. Assume that the value of the clipping parameter for the sample position, i.e. the pixel position, closest to the block boundary 2, i.e. $p_0$, is tc. Then, the clipping parameter value for the second pixel position, i.e. $p_1$, is tc×2/3, and the clipping parameter value for the third position form the block boundary 2, i.e. $p_2$, is tc/3.

Alternatively, assume that the value of the clipping parameter for the sample position, i.e. the pixel position, second closest to the block boundary, i.e. $p_1$, is tc2. Then, the clipping parameter value for the first pixel position, i.e. $p_0$, is tc2×3/2, and the clipping parameter value for the third position from the block boundary 2, i.e. $p_2$, is tc2/2.

FIG. 13 is a flow diagram illustrating an additional, optional step of the filtering control method that is performed according to the above described embodiment of calculating clipping parameter values. The method continues from step S1 in FIG. 9 or starts at step S6. This step S6 comprises calculating the clipping parameter values to be tc0=(tc×3+1)>>1 for a first pixel 12, relative to the block boundary 2, in the line 15 of pixels 12, 14, 16, 18, 22, 24, 26, 28, tc1=tc for a second pixel 14, relative to the block boundary 2, in the line 15 of pixels 12, 14, 16, 18, 22, 24, 26, 28 and tc2=(tc+1)>>1 for a third pixel 16, relative to the block boundary 2, in the line 15 of pixels 12, 14, 16, 18, 22, 24, 26, 28. In this embodiment, tc is a parameter that depends on a quantization parameter (QP) value associated with the block 10 of pixels 12, 14, 16, 18 and >> represents a right shift operator defined as $$a >> b = \left\lfloor \frac{a}{2^b} \right\rfloor$$

and $\lfloor c \rfloor$ is a largest integer not greater than c. The method then continues to step S1 or S2 of FIG. 9, where the calculated clipping parameter values are used to clip of the filtered pixel values.

In a variant of FIG. 13, step S6 instead comprises calculating the clipping parameter values to be tc1=((tc<<1)+tc+1)>>2 for a second pixel 14, relative to the block boundary 2, in the line 15 of pixels 12, 14, 16, 18, 22, 24, 26, 28, tc0=(tc1×3+1)>>1 for a first pixel 12, relative to the block boundary 2, in the line 15 of pixels 12, 14, 16, 18, 22, 24, 26, 28 and tc2=(tc1+1)>>1 for a third pixel 16, relative to the block boundary 2, in the line 15 of pixels 12, 14, 16, 18, 22, 24, 26, 28. << represents a left shift operator defined as $a << b = a \times 2^b$.

In another variant of FIG. 13, step S6 instead comprises calculating the clipping parameter values to be tc0=(tc×3+1)>>1 for a first pixel 12, relative to the block boundary 2, in the line 15 of pixels 12, 14, 16, 18, 22, 24, 26, 28, tc1=((tc<<1)+tc+1)>>2 for a second pixel 14, relative to the block boundary 2, in the line 15 of pixels 12, 14, 16, 18, 22, 24, 26, 28 and tc2=(tc+1)>>1 for a third pixel 16, relative to the block boundary 2, in the line 15 of pixels 12, 14, 16, 18, 22, 24, 26, 28.

In yet another variant of FIG. 13, step S6 instead comprises calculating the clipping parameter values to be tc0=tc for a first pixel 12, relative to the block boundary 2, in the line 15 of pixels 12, 14, 16, 18, 22, 24, 26, 28, tc1=((tc<<1)+tc+1)>>2 for a second pixel 14, relative to the block boundary 2, in the line 15 of pixels 12, 14, 16, 18, 22, 24, 26, 28 and tc2=(tc+1)>>1 for a third pixel 16, relative to the block boundary 2, in the line 15 of pixels 12, 14, 16, 18, 22, 24, 26, 28.

The value of the parameter tc can be obtained based on the QP value determined for or associated with the block 10 of pixels 12, 14, 16, 18. For instance, the QP value can be used to retrieve tc from a look-up table, such as Table 1.

Strong deblocking filtering typically involves filtering pixel values in the line 15 of pixels 12, 14, 16, 18, 22, 24, 26, 28 on either side of the block boundary 2, i.e. both in the block 10 of pixels 12, 14, 16, 18 and in the neighboring block 20 of pixels 22, 24, 26, 28. The clipping parameter values as determined according to the embodiments as defined in the foregoing are preferably applicable to both pixels 12, 14, 16 present in the block 10 of pixels 12, 14, 16, 18 and pixels 22, 24, 26 present in the neighboring block 20 of pixels 22, 24, 26, 28. All these pixels 12, 14, 16, 22, 24, 26, 28 are present in the same line 15 of pixels 12, 14, 16, 18, 22, 24, 26, 28. Pixel values of pixels 22, 24, 26, 28 present in the line 15 of pixels 12, 14, 16, 18, 22, 24, 26, 28 in the neighboring block 20 of pixels 22, 24, 26, 28 are generally denoted $q_x$ herein. In such a case, the clipping parameter value defined for the first pixel position is preferably the same regardless of this pixel 12 is present in the block 10 of pixels 12, 14, 16, 18, i.e. denoted $p_0$, or if the pixel 22 is the first pixel 22 in the neighboring block 20 of pixels 22, 24, 26, 28, i.e. denoted $q_0$. Hence, the clipping parameter value tc0 is preferably applicable to pixels 12, 22 with pixel values $p_0$ and $q_0$, the clipping parameter value tc1 is preferably applicable to pixels 14, 24 with pixel values $p_1$ and $q_1$ and the clipping parameter value tc2 is preferably applicable to pixels 16, 26 with pixel values $p_2$ and $q_2$.

FIG. 14 is a flow diagram illustrating a particular implementation example of the filtering step in FIG. 9. Filtering pixel values in a line 15 of pixels 12, 14, 16, 22, 24, 26, 28 with a strong deblocking filtering comprises, in this embodiment, calculating, in step S7, the filtered pixel values according to:

$$p_0'=(p_2+2 \times p_1+2 \times p_0+2 \times q_0+q_1+4)>>3$$

$$p_1'=(p_3+2 \times p_2+2 \times p_1+p_0+2 \times q_0+4)>>3$$

$$p_2'=(3 \times p_3+3 \times p_2+p_1+q_0+4)>>3$$

wherein $p_0$ represents a pixel value of a first pixel 12, relative to the block boundary 2, in the line 15 of pixels 12, 14, 16, 18, 22, 24, 26, 28 in the block 10 of pixels 12, 14, 16, 18, $p_1$ represents a pixel value of a second pixel 14, relative to the block boundary 2, in the line 15 of pixels 12, 14, 16, 18, 22, 24, 26, 28 in the block 10 of pixels 12, 14, 16, 18, $p_2$ represents a pixel value of a third pixel 16, relative to the block boundary 2, in the line 15 of pixels 12, 14, 16, 18, 22, 24, 26, 28 in the block 10 of pixels 12, 14, 16, 18, $p_3$ represents a pixel value of a fourth pixel 18, relative to the block boundary 2, in the line 15 of pixels 12, 14, 16, 18, 22, 24, 26, 28 in the block 10 of pixels 12, 14, 16, 18, $q_0$ represents a pixel value of a first pixel 22, relative to the block boundary 2, in the line 15 of pixels 12, 14, 16, 18, 22, 24, 26, 28 in the neighboring block 20 of pixels 22, 24, 26, 28, $q_1$ represents a pixel value of a second pixel 24, relative to the block boundary 2, in the line 15 of pixels 12, 14, 16, 18, 22, 24, 26, 28 in the neighboring block 20 of pixels 22, 24, 26, 28, $p_0'$ represents a filtered pixel value for the first pixel 12 in the line 15 of pixels 12, 14, 16, 18, 22, 24, 26, 28 in the block 10 of pixels 12, 14, 16, 18, $p_1'$ represents a filtered pixel value for the second pixel 14 in the line 15 of pixels 12, 14, 16, 18, 22, 24, 26, 28 in the block 10 of pixels 12, 14, 16, 18, $p_2'$ represents a filtered pixel value for the third pixel 16 in the line 15 of pixels 12, 14, 16, 18, 22, 24, 26, 28 in the block 10 of pixels 12, 14, 16, 18.

In a particular embodiment, step S7 preferably also comprises calculating filtered pixel values according to:

$$q_0'=(q_2+2 \times q_1+2 \times q_0+2 \times p_0+p_1+4)>>3$$

$$q_1'=(q_3+2 \times q_2+2 \times q_1+q_0+2 \times p_0+4)>>3$$

$$q_2'=(3 \times q_3+3 \times q_2+q_1+p_0+4)>>3$$

wherein $q_2$ represents a pixel value of a third pixel 26, relative to the block boundary 2, in the line 15 of pixels 12, 14, 16, 18, 22, 24, 26, 28 in the neighboring block 20 of pixels 22, 24, 26, 28, $q_3$ represents a pixel value of a fourth pixel 28, relative to the block boundary 2, in the line 15 of pixels 12, 14, 16, 18, 22, 24, 26, 28 in the neighboring block 20 of pixels 22, 24, 26, 28, $q_0'$ represents a filtered pixel value for the first pixel 22 in the line 15 of pixels 12, 14, 16, 18, 22, 24, 26, 28 in the neighboring block 20 of pixels 22, 24, 26, 28, $q_1'$ represents a filtered pixel value for the second pixel 24 in the line 15 of pixels 12, 14, 16, 18, 22, 24, 26, 28 in the neighboring block 20 of pixels 22, 24, 26, 28, $q_2'$ represents a filtered pixel value for the third pixel 26 in the line 15 of pixels 12, 14, 16, 18, 22, 24, 26, 28 in the neighboring block 20 of pixels 22, 24, 26, 28.

FIG. 15 is a flow diagram illustrating a particular implementation example of the filtering step in FIG. 9. Filtering pixel values in a line 15 of pixels 12, 14, 16, 22, 24, 26, 28 with a strong deblocking filtering comprises, in this embodiment, calculating, in step S8, the filtered pixel values according to:

$$p_0'=(p_2+2\times p_1+2\times p_0+2\times q_0+q_1+4)>>3$$

$$p_1'=(p_3+3\times p_2+2\times p_1+q_0+q_1+4)>>3$$

$$p_2'=(3\times p_3+4\times p_2+q_0+4)>>3$$

In a particular embodiment, step S8 preferably also comprises calculating filtered pixel values according to:

$$q_0'=(q_2+2\times q_1+2\times q_0+2\times p_0+p_1+4)>>3$$

$$q_1'=(q_3+3\times q_2+2\times q_1+p_0+p_1+4)>>3$$

$$q_2'=(3\times q_3+4\times q_2+p_0+4)>>3$$

FIG. 16 is a flow diagram illustrating a particular implementation example of the filtering step in FIG. 9. Filtering pixel values in a line 15 of pixels 12, 14, 16, 22, 24, 26, 28 with a strong deblocking filtering comprises, in this embodiment, calculating, in step S9, the filtered pixel values according to:

$$p_0'=(p_2+2\times p_1+2\times p_0+2\times q_0+q_1+4)>>3$$

$$p_1'=(p_2+p_1+p_0+q_0+2)>>2$$

$$p_2'=(2\times p_3+3\times p_2+p_1+p_0+q_0+4)>>3$$

In a particular embodiment, step S9 preferably also comprises calculating filtered pixel values according to:

$$q_0'=(q_2+2\times q_1+2\times q_0+2\times p_0+p_1+4)>>3$$

$$q_1'=(q_2+q_1+q_0+p_0+2)>>2$$

$$q_2'=(2\times q_3+3\times q_2+q_1+q_0+p_0+4)>>3$$

FIG. 1A is a flow diagram illustrating a method performed in a filtering control (ctrl) device. The method starts in step S10 where a smooth step function is applied to pixel values in the line of pixels. Hence, in this step S10 a strong deblocking filter that makes a step function smooth is applied to the pixel values, such as disclosed in FIG. 14 or 15. A next step S11 comprises applying unequal clipping to the filtered pixel values as disclosed herein.

FIGS. 1B and 1C are flow diagrams illustrating embodiments performed in a transmitter and a receiver, respectively. FIG. 1B involves sending, in step S20, signaling according to the embodiments and FIG. 1C correspondingly involves receiving, in step S30, signaling according to the embodiments.

Implementation Embodiments

The proposed implementation embodiments are examples of application of the proposed clipping. These examples are, however, not restrictive and can be used separately or in combination with each other or other methods.

Implementation Embodiment 1

An example of implementation of the proposed strong filter in integer arithmetics, including clipping:

$$p_0'=\text{Clip3}(p_0-2\times tc,p_0+2\times tc,(p_2+2\times p_1+2\times p_0+2\times q_0+q_1+4)>>3)$$

$$q_0'=\text{Clip3}(q_0-2\times tc,q_0+2\times tc,(p_1+2\times p_0+2\times q_0+2\times q_1+q_2+4)>>3)$$

$$p_2'=\text{Clip3}(p_1-tc2,p_1-tc2,(p_3+2\times p_2+2\times p_1+p_0+2\times q_0+4)>>3)$$

$$q_2'=\text{Clip3}(q_1-tc2,q_1-tc2,(q_3+2\times q_2+2\times q_1+q_0+2\times p_0+4)>>3)$$

$$p_3'=\text{Clip3}(p_2-tc3,p_2+tc3,(3\times p_3+3\times p_2+1\times p_1+0\times p_0+q_0+4)>>3)$$

$$q_3'=\text{Clip3}(q_2-tc3,q_2+tc3,(p_0+0\times q_0+1\times q_1+3\times q_2+3\times q_3+4)>>3),$$

where tc, tc1 and tc2 are clipping values for the first, second and third sample position from the block boundary respectively.

The clipping values generally depend on the quantization parameter (QP) value and can be stored in a look-up table. The clipping values can also be derived from other values, which in its turn depend on the quantization parameters (QP) and possibly other conditions.

Implementation Embodiment 2

An example of implementation of the proposed strong filter in integer arithmetics, including clipping:

$$p_0'=\text{Clip3}(p_0-tc0,p_0+tc0,(p_2+2\times p_1+2\times p_0+2\times q_0+q_1+4)>>3)$$

$$q_0'=\text{Clip3}(q_0-tc0,q_0+tc0,(p_1+2\times p_0+2\times q_0+2\times q_1+q_2+4)>>3)$$

$$p_1'=\text{Clip3}(p_1-tc1,p_1+tc1,(p_3+2\times p_2+2\times p_1+p_0+2\times q_0+4)>>3)$$

$$q_1'=\text{Clip3}(q_1-tc1,q_1+tc1,(q_3+2\times q_2+2\times q_1+q_0+2\times p_0+4)>>3)$$

$$p_2'=\text{Clip3}(p_2-tc2,p_2+tc2,(3\times p_3+3\times p_2+p_1+q_0+4)>>3)$$

$$q_2'=\text{Clip3}(q_2-tc2,q_2+tc2,(p_0+q_1+3\times q_2+3\times q_3+4)>>3),$$

where tc0, tc1 and tc2 are clipping values for the first, second and third sample position from the block boundary respectively.

The clipping values generally depend on the quantization parameter (QP) value and can be stored in a look-up table. The clipping values can also be derived from other values, which in its turn depend on the quantization parameters (QP) and possibly other conditions.

Implementation Embodiment 3

This embodiment shows the clipping value with the parameters (QP) and possibly other conditions.

$$tc2=tc$$

$$tc1=(tc\times3+1)>>1$$

$$tc3=(tc+1)>>1$$

where tc is the value of the current deblocking clipping parameter that depends on the clipping and possibly some other conditions.

Implementation Embodiment 4

This embodiment shows the clipping value with the parameters (QP) and possibly other conditions.

$$tc1=tc$$

$$tc0=(tc\times3+1)>>1$$

$$tc2=(tc+1)>>1$$

where tc is the value of the current deblocking clipping parameter that depends on the clipping and possibly some other conditions.

Implementation Embodiment 5

This embodiment shows the clipping value with the parameters (QP) and possibly some other conditions.

$$tc2=((tc<<1)+tc+1)>>2$$

$$tc1=(tc\times3+1)>>1$$

$$tc3=(tc+1)>>1,$$

where tc is the value of the current deblocking clipping parameter that depends on the clipping and possibly some other conditions.

Implementation Embodiment 6

This embodiment shows the clipping value with the parameters (QP) and possibly some other conditions.

$$tc1=((tc<<1)+tc+1)>>2$$

$$tc0=(tc1\times3+1)>>1$$

$$tc2=(tc1+1)>>1,$$

where tc is the value of the current deblocking clipping parameter that depends on the clipping and possibly some other conditions.

Implementation Embodiment 7

This embodiment is a combination of the proposed deblocking filter with clipping from implementation embodiment 3.

$$tc2=tc$$

$$tc1=(tc\times3+1)>>1$$

$$tc3=(tc+1)>>1$$

$$p_0'=\text{Clip3}(p_0-2\times tc, p_0+2\times tc, (p_2+2\times p_1+2\times p_0+2\times q_0+q_1+4)>>3)$$

$$q_0'=\text{Clip3}(q_0-2\times tc, q_0+2\times tc, (p_1+2\times p_0+2\times q_0+2\times q_1+q_2+4)>>3)$$

$$p_2'=\text{Clip3}(p_1-tc2, p_1+tc2, (p_3+2\times p_2+2\times p_1+p_0+2\times q_0+4)>>3)$$

$$q_2'=\text{Clip3}(q_1-tc2, q_1+tc2, (q_3+2\times q_2+2\times q_1+q_0+2\times p_0+4)>>3)$$

$$p_3'=\text{Clip3}(p_2-tc3, p_2+tc3, (3\times p_3+3\times p_2+1\times p_1+0\times p_0+q_0+4)>>3)$$

$$q_3'=\text{Clip3}(q_2-tc3, q_2+tc3, (p_0+0\times q_0+1\times q_1+3\times q_2+3\times q_3+4)>>3)$$

Implementation Embodiment 8

This embodiment is a combination of the proposed deblocking filter with clipping from implementation embodiment 4.

$$tc1=tc$$

$$tc0=(tc\times3+1)>>1$$

$$tc2=(tc+1)>>1$$

$$p_0'=\text{Clip3}(p_0-tc0, p_0+tc0, (p_2+2\times p_1+2\times p_0+2\times q_0+q_1+4)>>3)$$

$$q_0'=\text{Clip3}(q_0-tc0, q_0+tc0, (p_1+2\times p_0+2\times q_0+2\times q_1+q_2+4)>>3)$$

$$p_1'=\text{Clip3}(p_1-tc1, p_1+tc1, (p_3+2\times p_2+2\times p_1+p_0+2\times q_0+4)>>3)$$

$$q_1'=\text{Clip3}(q_1-tc1, q_1+tc1, (q_3+2\times q_2+2\times q_1+q_0+2\times p_0+4)>>3)$$

$$p_2'=\text{Clip3}(p_2-tc2, p_2+tc2, (3\times p_3+3\times p_2+p_1+q_0+4)>>3)$$

$$q_2'=\text{Clip3}(q_2-tc2, q_2+tc2, (p_0+q_1+3\times q_2+3\times q_3+4)>>3)$$

Implementation Embodiment 9

This embodiment is a combination of the proposed deblocking filter with clipping from implementation embodiment 5.

$$tc2=((tc<<1)+tc+1)>>2$$

$$tc1=(tc\times3+1)>>1$$

$$tc3=(tc+1)>>1,$$

$$p_0'=\text{Clip3}(p_0-2\times tc, p_0+2\times tc, (p_2+2\times p_1+2\times p_0+2\times q_0+q_1+4)>>3)$$

$$q_0'=\text{Clip3}(q_0-2\times tc, q_0+2\times tc, (p_1+2\times p_0+2\times q_0+2\times q_1+q_2+4)>>3)$$

$$p_2'=\text{Clip3}(p_1-tc2, p_1+tc2, (p_3+2\times p_2+2\times p_1+p_0+2\times q_0+4)>>3)$$

$$q_2'=\text{Clip3}(q_1-tc2, q_1+tc2, (q_3+2\times q_2+2\times q_1+q_0+2\times p_0+4)>>3)$$

$$p_3'=\text{Clip3}(p_2-tc3, p_2+tc3, (3\times p_3+3\times p_2+1\times p_1+0\times p_0+q_0+4)>>3)$$

$$q_3'=\text{Clip3}(q_2-tc3, q_2+tc3, (p_0+0\times q_0+1\times q_1+3\times q_2+3\times q_3+4)>>3)$$

Implementation Embodiment 10

This embodiment is a combination of the proposed deblocking filter with clipping from implementation embodiment 6.

$$tc1=((tc<<1)+tc+1)>>2$$

$$tc0=(tc1\times3+1)>>1$$

$tc3=(tc1+1)>>1$ $p_0'=\text{Clip3}(p_0-tc0,p_0+tc0,(p_2+2\times p_1+2\times p_0+2\times q_0+q_1+4)>>3)$ $q_0'=\text{Clip3}(q_0-tc0,q_0+tc0,(p_1+2\times p_0+2\times q_0+2\times q_1+q_2+4)>>3)$ $p_1'=\text{Clip3}(p_1-tc1,p_1+tc1,(p_3+2\times p_2+2\times p_1+p_0+2\times q_0+4)>>3)$ $q_1'=\text{Clip3}(q_1-tc1,q_1+tc1,(q_3+2\times q_2+2\times q_1+q_0+2\times p_0+4)>>3)$ $p_2'=\text{Clip3}(p_2-tc2,p_2+tc2,(3\times p_3+3\times p_2+p_1+q_0+4)>>3)$ $q_2'=\text{Clip3}(q_2-tc2,q_2+tc2,(p_0+q_1+3\times q_2+3\times q3+4)>>3)$

Implementation Embodiment 11

This embodiment an integer implementation of an alternative deblocking filter with clipping:

$p_0'=\text{Clip3}(p_0-2\times tc,p_0+2\times tc,(p_2+2\times p_1+2\times p_0+2\times q_0+q_1+4)>>3)$ $q_0'=\text{Clip3}(q_0-2\times tc,q_0+2*tc,(p_1+2\times p_0+2\times q_0+2\times q_1+q_2+4)>>3)$ $p_2'=\text{Clip3}(p_1-tc2,p_1+tc2,(p_3+3\times p_2+2\times p_1+q_0+q_1+4)>>3)$ $q_2'=\text{Clip3}(q_1-tc2,q_1+tc2,(q_3+3\times q_2+2\times q_1+p_0+p_1+4)>>3)$ $p_3'=\text{Clip3}(p_2-tc3,p_2+tc3,(3\times p_3+4\times p_2+q_0+4)>>3)$ $q_3'=\text{Clip3}(q_2-tc3,q_2+tc3,(p_0+4\times q_2+3\times q_3+4)>>3)$

Implementation Embodiment 12

This embodiment an integer implementation of an alternative deblocking filter with clipping:

$p_0'=\text{Clip3}(p_0-tc0,p_0+tc0,(p_2+2\times p_1+2\times p_0+2\times q_0+q_1+4)>>3)$ $q_0'=\text{Clip3}(q_0-tc0,q_0+tc0,(p_1+2\times p_0+2\times q_0+2\times q_1+q_2+4)>>3)$ $p_1'=\text{Clip3}(p_1-tc1,p_1+tc1,(p_3+3\times p_2+2\times p_1+q_0+q_1+4)>>3)$ $q_2'=\text{Clip3}(q_1-tc1,q_1+tc1,(q_3+3\times q_2+2\times q_1+p_0+p_1+4)>>3)$ $p_2'=\text{Clip3}(p_2-tc2,p_2+tc2,(3\times p_3+4\times p_2+q_0+4)>>3)$ $q_2'=\text{Clip3}(q_2-tc2,q_2+tc2,(p_0+4\times q_2+3\times q_3+4)>>3)$

Implementation Embodiment 13

The alternative deblocking filter from embodiments 12 and 13 can also be used in combination with the clipping proposed in implementation embodiments 3 to 6. Other deblocking filters, as well as the current HEVC strong deblocking filter, can also be used with the clipping proposed in implementation embodiments 3 to 6.

The proposed solution improves the subjective and objective quality of the HEVC strong filtering. The unequal clipping prevent artifacts at the block boundary to appear, such as a ripple or wave, which otherwise could be created.

The implementation example shown in FIG. 16 corresponds to the strong deblocking filter currently used in the prior art as indicated in the section strong filtering for HEVC in the background section.

One can see that although the HEVC strong deblocking filter efficiently suppresses the blocking artifacts, it does not preserve a ramp signal. This means that if the HEVC strong filter is applied to the signal that has a shape of a perfect ramp, e.g. 10 20 30 40, the ramp gets distorted. The shape then becomes similar to that of a wave. It means that when the strong filter is applied to areas with a gradient change in the intensity of pixel values, the filter can produce artifacts that have a shape of a ripple or wave. This can decrease the subjective quality of the filtered video.

The implementation examples shown in FIGS. 14 and 15 provide an improved strong deblocking filter for HEVC standard, which has better characteristics than the current strong filter in HEVC. The proposed filter does not modify the ramp but makes a step function smooth. A ramp can be described as linearly increasing or decreasing pixel values, e.g. 10 20 30 40. A step function can be described as a step increase or decrease in pixel values, e.g. 10 10 20 20. The filter provides strong low-pass characteristics in a way similar to the current HEVC deblocking filter.

The new strong deblocking filters as proposed in FIGS. 14 and 15 can advantageously be used in connection with the filtering control method of FIG. 9, i.e. using clipping parameter values defined based on pixel positions relative to the block boundary and where the clipping parameter values change at least approximately linearly depending on the pixel position relative to the block boundary so that pixels in the line of pixels having different pixel positions from the block boundary have different clipping parameter values.

In an alternative approach, strong deblocking filters proposed in FIGS. 14 and 15 could be applied independent of the particular clipping approach taken. Hence, these strong deblocking filters could be applied also to the situation with the prior art clipping function, i.e. using the same clipping parameter value regardless of pixel position, or without using any clipping of filtered pixel values.

Hence, an aspect of the embodiments relates to a deblocking filtering method. The deblocking filtering method comprises deblocking filtering pixel values of pixels 12, 14, 16, 22, 24, 26, 28 in a line 15 of pixels 12, 14, 16, 18, 22, 24, 26, 28 in a block 10 of pixels 12, 14, 16, 18 and in a neighboring block 20 of pixels 22, 24, 26, 28 by calculating filtered pixel values according to:

$p_0'=(p_2+2\times p_1+2\times p_0+2\times q_0+q_1+4)>>3$ $q_0'=(p_1+2\times p_0+2\times q_0+2\times q_1+q_2+4)>>3$ $p_1'=(p_3+2\times p_2+2\times p_1+p_0+2\times q_0+4)>>3$ $q_1'=(q_3+2\times q_2+2\times q_1+q_0+2\times p_0+4)>>3$ $p_2'=(3\times p_3+3\times p_2+p_1+q_0+4)>>3$ $q_2'=(p_0+q_1+3\times q_2+3\times q_3+4)>>3$ wherein $p_0$ represents a pixel value of a first pixel 12, relative to a block boundary 2 between the block 10 of pixels 12, 14, 16, 18 and the neighboring block 20 of pixels 22, 24, 26, 28, in the line 15 of pixels 12, 14, 16, 18, 22, 24, 26, 28 in the block 10 of pixels 12, 14, 16, 18, $p_1$ represents a pixel value of a second pixel 14, relative to the block boundary 2, in the line 15 of pixels 12, 14, 16, 18, 22, 24, 26, 28 in the block 10 of pixels 12, 14, 16, 18, $p_2$ represents a pixel value of a third pixel 16, relative to the block boundary 2, in the line 15 of pixels 12, 14, 16, 18, 22, 24, 26, 28 in the block 10 of pixels 12, 14, 16, 18, $p_3$ represents a pixel value of a fourth pixel 18, relative to the block boundary 2, in the line 15 of pixels 12, 14, 16, 18, 22, 24, 26, 28 in the block 10 of pixels 12, 14, 16, 18, $q_0$ represents a pixel value of a first pixel 22, relative to the block boundary 2, in the line 15 of pixels 12, 14, 16, 18, 22, 24, 26, 28 in the neighboring block 20 of pixels 22, 24, 26, 28, $q_1$ represents a pixel value of a second pixel 24, relative to the block boundary 2, in the line 15 of pixels 12, 14, 16, 18, 22, 24, 26, 28 in the neighboring block 20 of pixels 22, 24, 26, 28, $q_2$ represents a pixel value of a third pixel 26, relative to the block boundary 2, in the line 15 of pixels 12, 14, 16, 18, 22, 24, 26, 28 in the neighboring block 20 of pixels 22, 24, 26, 28, $q_3$ represents a pixel value of a fourth pixel 28, relative to the block boundary 2, in the line 15 of pixels 12, 14, 16, 18, 22, 24, 26, 28 in the neighboring block 20 of pixels 22, 24, 26, 28, $p_0'$ represents a filtered pixel value for the first pixel 12 in the line 15 of pixels 12, 14, 16, 18, 22, 24, 26, 28 in the block 10 of pixels 12, 14, 16, 18, $p_1'$ represents a filtered pixel value for the second pixel 14 in the line 15 of pixels 12, 14, 16, 18, 22, 24, 26, 28 in the block 10 of pixels 12, 14, 16, 18, $p_2'$ represents a filtered pixel value for the third pixel 16 in the line 15 of pixels 12, 14, 16, 18, 22, 24, 26, 28 in the block 10 of pixels 12, 14, 16, 18, $q_0'$ represents a filtered pixel value for the first pixel 22 in the line 15 of pixels 12, 14, 16, 18, 22, 24, 26, 28 in the neighboring block 20 of pixels 22, 24, 26, 28, $q_1'$ represents a filtered pixel value for the second pixel 24 in the line 15 of pixels 12, 14, 16, 18, 22, 24, 26, 28 in the neighboring block 20 of pixels 22, 24, 26, 28, $q_2'$ represents a filtered pixel value for the third pixel 26 in the line 15 of pixels 12, 14, 16, 18, 22, 24, 26, 28 in the neighboring block 20 of pixels 22, 24, 26, 28, and >> represents a right shift operator defined as $$a >> b = \left\lfloor \frac{a}{2^b} \right\rfloor$$

and $\lfloor c \rfloor$ is a largest integer not greater than c.

Another aspect of the embodiments relates to a deblocking filtering method. The deblocking filtering method comprises deblocking filtering pixel values of pixels 12, 14, 16, 22, 24, 26, 28 in a line 15 of pixels 12, 14, 16, 18, 22, 24, 26, 28 in a block 10 of pixels 12, 14, 16, 18 and in a neighboring block 20 of pixels 22, 24, 26, 28 by calculating filtered pixel values according to:

$$p_0'=(p_2+2\times p_1+2\times p_0+2\times q_0+q_1+4)>>3$$

$$q_0'=(p_1+2\times p_0+2\times q_0+2\times q_1+q_2+4)>>3$$

$$p_1'=(p_3+3\times p_2+2\times p_1+q_0+q_1+4)>>3$$

$$q_1'=(q_3+3\times q_2+2\times q_1+p_0+p_1+4)>>3$$

$$p_2'=(3\times p_3+4\times p_2+q_0+4)>>3$$

$$q_2'=(p_0+4\times q_2+3\times q_3+4)>>3$$

wherein $p_0$ represents a pixel value of a first pixel 12, relative to a block boundary 2 between the block 10 of pixels 12, 14, 16, 18 and the neighboring block 20 of pixels 22, 24, 26, 28, in the line 15 of pixels 12, 14, 16, 18, 22, 24, 26, 28 in the block 10 of pixels 12, 14, 16, 18, $p_1$ represents a pixel value of a second pixel 14, relative to the block boundary 2, in the line 15 of pixels 12, 14, 16, 18, 22, 24, 26, 28 in the block 10 of pixels 12, 14, 16, 18, $p_2$ represents a pixel value of a third pixel 16, relative to the block boundary 2, in the line 15 of pixels 12, 14, 16, 18, 22, 24, 26, 28 in the block 10 of pixels 12, 14, 16, 18, $p_3$ represents a pixel value of a fourth pixel 18, relative to the block boundary 2, in the line 15 of pixels 12, 14, 16, 18, 22, 24, 26, 28 in the block 10 of pixels 12, 14, 16, 18, $q_0$ represents a pixel value of a first pixel 22, relative to the block boundary 2, in the line 15 of pixels 12, 14, 16, 18, 22, 24, 26, 28 in the neighboring block 20 of pixels 22, 24, 26, 28, $q_1$ represents a pixel value of a second pixel 24, relative to the block boundary 2, in the line 15 of pixels 12, 14, 16, 18, 22, 24, 26, 28 in the neighboring block 20 of pixels 22, 24, 26, 28, $q_2$ represents a pixel value of a third pixel 26, relative to the block boundary 2, in the line 15 of pixels 12, 14, 16, 18, 22, 24, 26, 28 in the neighboring block 20 of pixels 22, 24, 26, 28, $q_3$ represents a pixel value of a fourth pixel 28, relative to the block boundary 2, in the line 15 of pixels 12, 14, 16, 18, 22, 24, 26, 28 in the neighboring block 20 of pixels 22, 24, 26, 28, $p_0'$ represents a filtered pixel value for the first pixel 12 in the line 15 of pixels 12, 14, 16, 18, 22, 24, 26, 28 in the block 10 of pixels 12, 14, 16, 18, $p_1'$ represents a filtered pixel value for the second pixel 14 in the line 15 of pixels 12, 14, 16, 18, 22, 24, 26, 28 in the block 10 of pixels 12, 14, 16, 18, $p_2'$ represents a filtered pixel value for the third pixel 16 in the line 15 of pixels 12, 14, 16, 18, 22, 24, 26, 28 in the block 10 of pixels 12, 14, 16, 18, $q_0'$ represents a filtered pixel value for the first pixel 22 in the line 15 of pixels 12, 14, 16, 18, 22, 24, 26, 28 in the neighboring block 20 of pixels 22, 24, 26, 28, $q_1'$ represents a filtered pixel value for the second pixel 24 in the line 15 of pixels 12, 14, 16, 18, 22, 24, 26, 28 in the neighboring block 20 of pixels 22, 24, 26, 28, $q_2'$ represents a filtered pixel value for the third pixel 26 in the line 15 of pixels 12, 14, 16, 18, 22, 24, 26, 28 in the neighboring block 20 of pixels 22, 24, 26, 28, and >> represents a right shift operator defined as $$a >> b = \left\lfloor \frac{a}{2^b} \right\rfloor$$

and $\lfloor c \rfloor$ is a largest integer not greater than c.

It can be seen from the HEVC strong filter description that when the filter is applied to the signal that has a form of a ramp, the filters applied to the samples closest to the block boundary do not modify a ramp since the filters applied to these samples are symmetric filters with odd number of filter taps. Unlike this, the filter for second and the third sample from the block boundary in HEVC strong filter do modify the ramp. Therefore, the proposed filters use the same equations for the sample values closest to the block boundary, whereas other expressions than in the HEVC strong deblocking filter are used for the sample values that are further away from the block boundary.

It is proposed to use the deblocking filter that is based on the following formula:

$$p_0'=(p_2+2\times p_1+2\times p_0+2\times q_0+q_1)/8$$

$$q_0'=(p_1+2\times p_0+2\times q_0+2\times q_1+q_2)/8$$

$$p_1'=(p_3+2\times p_2+2\times p_1+p_0+2\times q_0)/8$$

$$q_1'=(q_3+2\times q_2+2\times q_1+q_0+2\times p_0)/8$$

$$p_2'=(3\times p_3+3\times p_2+p_1+q_0)/8$$

$$q_2'=(p_0+q_1+3\times q_2+3\times q_3)/8$$

An alternative filter with similar properties can be used instead.

$p_0'=(p_2+2 \times p_1+2 \times p_0+2 \times q_0+q_1)/8$ $q_0'=(p_1+2 \times p_0+2 \times q_0+2 \times q_1+q_2)/8$ $p_1'=(p_3+3 \times p_2+2 \times p_1+q_0+q_1)/8$ $q_1'=(q_3+3 \times q_2+2 \times q_1+p_0+p_1)/8$ $p_2'=(3 \times p_3+4 \times p_2+q_0)/8$ $q_2'=(p_0+4 \times q_2+3 \times q_3)/8$ Implementation Embodiment The proposed implementation embodiments are examples of application of the proposed filter. These examples are, however, not restrictive and can be used separately or in combination with each other or other methods.

Implementation Embodiment 14

An example of implementation of the proposed strong filter in integer arithmetics $p_0'=(p_2+2 \times p_1+2 \times p_0+2 \times q_0+q_1+4)>>3$ $q_0'=(p_1+2 \times p_0+2 \times q_0+2 \times q_1+q_2+4)>>3$ $p_2'=(p_3+2 \times p_2+2 \times p_1+p_0+2 \times q_0+4)>>3$ $q_2'=(q_3+2 \times q_2+2 \times q_1+q_0+2 \times p_0+4)>>3$ $p_3'=(3 \times p_3+3 \times p_2+p_1+q_0+4)>>3$ $q_3'=(p_0+q_1+3 \times q_2+3 \times q_3+4)>>3$ Implementation Embodiment 15

An example of implementation of the proposed strong filter in integer arithmetics $p_0'=(p_2+2 \times p_1+2 \times p_0+2 \times q_0+q_1+4)>>3$ $q_0'=(p_1+2 \times p_0+2 \times q_0+2 \times q_1+q_2+4)>>3$ $p_1'=(p_3+2 \times p_2+2 \times p_1+p_0+2 \times q_0+4)>>3$ $q_1'=(q_3+2 \times q_2+2 \times q_1+q_0+2 \times p_0+4)>>3$ $p_2'=(3 \times p_3+3 \times p_2+p_1+q_0+4)>>3$ $q_2'=(p_0+q_1+3 \times q_2+3 \times q_3+4)>>3$ Implementation Embodiment 16

This embodiment is an integer implementation of an alternative deblocking filter.

$p_0'=(p_2+2 \times p_1+2 \times p_0+2 \times q_0+q_1+4)>>3$ $q_0'=(p_1+2 \times p_0+2 \times q_0+2 \times q_1+q_2+4)>>3$ $p_2'=(p_3+3 \times p_2+2 \times p_1+q_0+q_1+4)>>3$ $q_2'=(q_3+3 \times q_2+2 \times q_1+p_0+p_1+4)>>3$ $p_3'=(3 \times p_3+4 \times p_2+q_0+4)>>3$ $q_3'=(p_0+4 \times q_2+3 \times q_3+4)>>3$ Implementation Embodiment 17

This embodiment is an integer implementation of an alternative deblocking filter.

$p_0'=(p_2+2 \times p_1+2 \times p_0+2 \times q_0+q_1+4)>>3$ $q_0'=(p_1+2 \times p_0+2 \times q_0+2 \times q_1+q_2+4)>>3$ $p_1'=(p_3+3 \times p_2+2 \times p_1+q_0+q_1+4)>>3$ $q_1'=(q_3+3 \times q_2+2 \times q_1+p_0+p_1+4)>>3$ $p_2'=(3 \times p_3+4 \times p_2+q_0+4)>>3$ $q_2'=(p_0+4 \times q_2+3 \times q_3+4)>>3$ Implementation Embodiment 18

The filters proposed in implementation embodiments 14 to 17 can be used with the clipping implementation embodiments 1 to 13, with other clipping, e.g. uniform clipping, or without any clipping. Other combinations of embodiments are possible.

The proposed solution improves the subjective and objective quality of the HEVC strong filtering. The new strong deblocking filters prevent artifacts at the block boundary to appear, such as a ripple or wave, which otherwise could be created if the current HEVC filter is applied to the block boundaries.

Figure 17:
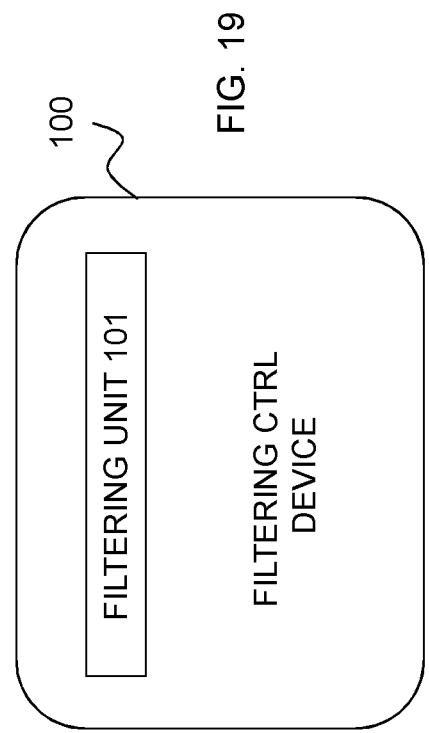
FIG. 17 is a schematic block diagram of a filtering control (ctrl) device according to another embodiment.

FIG. 17 is a schematic block diagram of a filtering control (ctrl) device 100 according to an embodiment, also referred herein to as a filtering device. The filtering control device 100 comprises a filtering unit 101 configured to filter pixel values of pixel in a line of pixels in a block of pixels with a strong deblocking filter to obtain filtered pixel values. The filtering control device 100 also comprises a clipping unit 102 configured to clip off, for each filtered pixel value of a pixel in the line of pixels, the filtered pixel value to a respective clipping parameter value defined based on a position of the pixel relative to a block boundary between the block of pixels and a neighboring block of pixels. The clipping parameter values change at least approximately linearly depending on the position of the pixel relative to the block boundary and pixels in the line of pixels having different positions from the block boundary have different clipping parameter values.

The filtering unit 101 of the filtering control device 100 is also referred to herein as a filtering means or module and the clipping unit 102 is correspondingly also referred to as a clipper, clipping means or module.

In an embodiment, a pixel in the line of pixels further away from the block boundary has a smaller clipping parameter value than another pixel in the line of pixels closer to the block boundary.

In an embodiment, the clipping parameter values form a straight line depending on a distance of the pixel from the block boundary.

In an embodiment, the clipping unit 102 is configured to calculate, for each filtered pixel value, a clipped filtered pixel value x'=Clip3(A, B, x), which is defined as in the foregoing.

Figure 18:
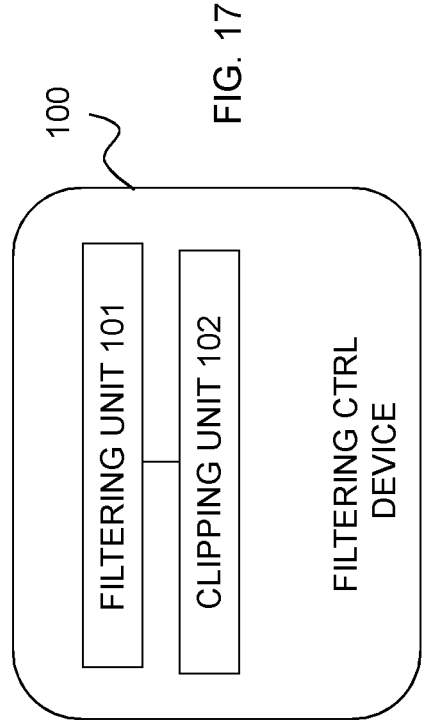
FIG. 18 is a schematic block diagram of a filtering control (ctrl) device according to a further embodiment.

FIG. 18 is a schematic block diagram of a filtering control (ctrl) device 100 according to another embodiment. In this embodiment, the filtering control device 100 comprises, in addition to the filtering unit 101 and the clipping unit 102, also a value calculator 103. The value calculator 103 is configured to calculate the clipping parameter values to be $tc0=(tc \times 3+1)>>1$ for a first pixel, relative to the block boundary, in the line of pixels, $tc1=tc$ for a second pixel, relative to the block boundary, in the line of pixels and $tc2=(tc+1)>>1$ for a third pixel, relative to the block boundary, in the line of pixels.

In another embodiment, the value calculator 103 is configured to calculate the clipping parameter values to be $tc1=((tc<<1)+tc+1)>>2$ for a second pixel, relative to the block boundary, in the line of pixels, $tc0=(tc1 \times 3+1)>>1$ for a first pixel, relative to the block boundary, in the line of pixels and $tc2=(tc1+1)>>1$ for a third pixel, relative to the block boundary, in the line of pixels.

In a further embodiment, the value calculator 103 is configured to calculate the clipping parameter values to be $tc0=(tc \times 3+1)>>1$ for a first pixel, relative to the block boundary, in the line of pixels, $tc1=((tc<<1)+tc+1)>>2$ for a second pixel, relative to the block boundary, in the line of pixels and $tc2=(tc+1)>>1$ for a third pixel, relative to the block boundary, in the line of pixels.

In yet another embodiment, the value calculator 103 is configured to calculate the clipping parameter values to be $tc0=tc$ for a first pixel, relative to the block boundary, in the line of pixels, $tc1=((tc<<1)+tc+1)>>2$ for a second pixel, relative to the block boundary, in the line of pixels and $tc2=(tc+1)>>1$ for a third pixel, relative to the block boundary, in the line of pixels.

The value calculator 103 is also referred to herein as a value calculating unit, means or module.

In an embodiment, the filtering unit 101 of FIG. 17 or 18 is configured to calculate the filtered pixel values according to:

$$p_0'=(p_2+2 \times p_1+2 \times p_0+2 \times q_0+q_1+4)>>3$$

$$p_1'=(p_3+2 \times p_2+2 \times p_1+p_0+2 \times q_0+4)>>3$$

$$p_2'=(3 \times p_3+3 \times p_2+p_1+q_0+4)>>3$$

In a particular embodiment, the filtering unit 101 is also configured to calculate filtered pixel values according to:

$$q_0'=(q_2+2 \times q_1+2 \times q_0+2 \times p_0+p_1+4)>>3$$

$$q_1'=(q_3+2 \times q_2+2 \times q_1+q_0+2 \times p_0+4)>>3$$

$$q_2'=(3 \times q_3+3 \times q_2+q_1+p_0+4)>>3$$

In another embodiment, the filtering unit 101 of FIG. 17 or 18 is configured to calculate the filtered pixel values according to:

$$p_0'=(p_2+2 \times p_1+2 \times p_0+2 \times q_0+q_1+4)>>3$$

$$p_1'=(p_3+3 \times p_2+2 \times p_1+q_0+q_1+4)>>3$$

$$p_2'=(3 \times p_3+4 \times p_2+q_0+4)>>3$$

In a particular embodiment, the filtering unit 101 is also configured to calculate filtered pixel values according to:

$$q_0'=(q_2+2 \times q_1+2 \times q_0+2 \times p_0+p_1+4)>>3$$

$$q_1'=(q_3+3 \times q_2+2 \times q_1+p_0+p_1+4)>>3$$

$$q_2'=(3 \times q_3+4 \times q_2+p_0+4)>>3$$

In a further embodiment, the filtering unit 101 of FIG. 17 or 18 is configured to calculate the filtered pixel values according to:

$$p_0'=(p_2+2 \times p_1+2 \times p_0+2 \times q_0+q_1+4)>>3$$

$$p_1'=(p_2+p_1+p_0+q_0+2)>>2$$

$$p_2'=(2 \times p_3+3 \times p_2+p_1+p_0+q_0+4)>>3$$

In a particular embodiment, the filtering unit 101 is also configured to calculate filtered pixel values according to:

$$q_0'=(q_2+2 \times q_1+2 \times q_0+2 \times p_0+p_1+4)>>3$$

$$q_1'=(q_2+q_1+q_0+p_0+2)>>2$$

$$q_2'=(2 \times q_3+3 \times q_2+q_1+q_0+p_0+4)>>3$$

FIG. 7 is a schematic block diagram of a further embodiment of a filtering control (ctrl) device 100. The filtering control device 100 comprises, in this embodiment, a processing unit 120 configured to filter pixel values of pixel in a line of pixels in a block of pixels with a strong deblocking filter to obtain filtered pixel values. The processing unit 120 is also configured to clip off, for each filtered pixel value of a pixel in the line of pixels, the filtered pixel value to a respective clipping parameter value defined based on a position of the pixel relative to a block boundary between the block of pixels and a neighboring block of pixels. The clipping parameter values change at least approximately linearly depending on the position of the pixel relative to the block boundary and pixels in the line of pixels having different positions from the block boundary have different clipping parameter values.

The processing unit 120 is also referred to herein as processor or processing means, circuit or module.

Hence, the processing unit 120 of FIG. 7 basically performs the operations of the filtering unit and the clipping unit of FIG. 17. In an embodiment, the processing unit 120 of FIG. 7 basically performs the operations of the filtering unit, the clipping unit and the value calculator of FIG. 18.

Accordingly as illustrated in FIGS. 7, 17 and 18, the filtering control device implements the functions of the implementation embodiments or a combination thereof by the processing unit or the filtering unit, the clipping unit and the optional value calculator, which is configured to apply unequal clipping.

The filtering control device 100 of FIGS. 7, 17 and 18 with their including units 101-102, 120 (and optional unit 103) could be implemented in hardware. There are numerous variants of circuitry elements that can be used and combined to achieve the functions of the units 101-102, 120 of the filtering control device 100. Such variants are encompassed by the embodiments. Particular examples of hardware implementation of the filtering control device 100 is implementation in digital signal processor (DSP) hardware and integrated circuit technology, including both general-purpose electronic circuitry and application-specific circuitry.

Hence, the steps, functions, procedures and/or blocks described above may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures and/or blocks described above may be implemented in software such as a computer program for execution by suitable processing circuitry including one or more processing units. Examples of processing circuitry includes, but is not limited to, one or more microprocessors, one or more DSPs, one or more Central Processing Units (CPUs), video acceleration hardware, and/or any suitable programmable logic circuitry such as one or more Field Programmable Gate Arrays (FPGAs) or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

The filtering control device 100 described herein could alternatively be implemented e.g. by one or more of a processing unit 72 in a computer 70 and adequate software with suitable storage or memory therefore, a programmable logic device (PLD) or other electronic component(s) as shown in FIG. 8.

In the following, an example of a computer implementation will be described with reference to FIG. 8. The computer 70 comprises a processing unit 72, such as one or more processors or a processing circuit, and a memory 73 represented by a computer program product in the figure. In this particular example, at least some of the steps, functions, procedures and/or blocks described above are implemented in a computer program 74, which is loaded into the memory 73 for execution by the processing unit 72. The processing unit 72 and memory 73 are interconnected to each other to enable normal software execution. An optional input/output unit 71 may also be interconnected to the processing unit 72 and/or the memory 73 to enable input and/or output of relevant data such as input parameter(s) and/or resulting output parameter(s).

The term 'computer' should be interpreted in a general sense as any system or device capable of executing program code or computer program instructions to perform a particular processing, determining or computing task.

The software or computer program 74 may be realized as a computer program product 73, which is normally carried or stored on a computer-readable medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Universal Serial Bus (USB) memory, a Hard Disk Drive (HDD) storage device, a flash memory, or any other conventional memory device. The computer program 74 may thus be loaded into the operating memory of a computer 70 or equivalent processing device for execution by the processing unit 72 thereof.

For example, the computer program 74 stored in memory includes program instructions executable by the processing unit 72, whereby the processing unit 72 is able or operative to execute the above-described steps, functions, procedure and/or blocks.

The computer 70 or processing unit 72 does not have to be dedicated to only execute the above-described steps, functions, procedure and/or blocks, but may also execute other tasks.

FIG. 8 schematically illustrates an embodiment of a computer 70 having a processing unit 72, such as a DSP or CPU. The processing unit 72 can be a single unit or a plurality of units for performing different steps of the method described herein. The computer 70 also comprises an optional input/output (I/O) unit 71 for receiving recorded or generated video frames or encoded video frames and outputting encoded video frame or decoded video data. The I/O unit 71 has been illustrated as a single unit in FIG. 8 but can likewise be in the form of a separate input unit and a separate output unit.

Furthermore, the computer 70 comprises at least one computer program product 73 in the form of a non-volatile memory, for instance an EEPROM (Electrically Erasable Programmable Read-Only Memory) or a flash memory. The computer program product 73 comprises a computer program 74, which comprises code means 310 which when run on or executed by the computer 70, such as by the processing unit 72, causes the computer 70 to perform the steps of the method described in the foregoing in connection with FIGS. 1, 9-16. Hence, in an embodiment the code means 310 in the computer program 74 comprises a module configured to implement the implementation embodiments or combinations thereof. This module essentially performs the steps of the flow diagrams in FIGS. 1, 9-16 when run on the processing unit 72. Thus, when the module is run on the processing unit 72 they correspond to the corresponding units 101, 102 and optional 103 of FIGS. 17 and 18 and unit 120 of FIG. 7.

An embodiment therefore relates to a computer program 74 comprising code means 310, which when executed by a processing unit 72, causes the processing unit 72 to filter pixel values of pixel in a line of pixels in a block of pixels with a strong deblocking filter to obtain filtered pixel values. The code means 310 of the computer program 74 also causes the processing unit 72 to clip off, for each filtered pixel value of a pixel in the line of pixels, the filtered pixel value to a respective clipping parameter value defined based on a position of the pixel relative to a block boundary between the block of pixels and a neighboring block of pixels. The clipping parameter values change at least approximately linearly depending on the position of the pixel relative to the block boundary and pixels in the line of pixels having different positions from the block boundary have different clipping parameter values.

An embodiment relates to a computer program product 73 comprising computer readable code means and a computer program 74 according to above stored on the computer readable code means.

The deblocking filter is used in video coding. It functions in both the video encoder and in the video decoder. The video decoder can be implemented preferably in hardware but also in software. The same holds for the video encoder.

Figure 2:
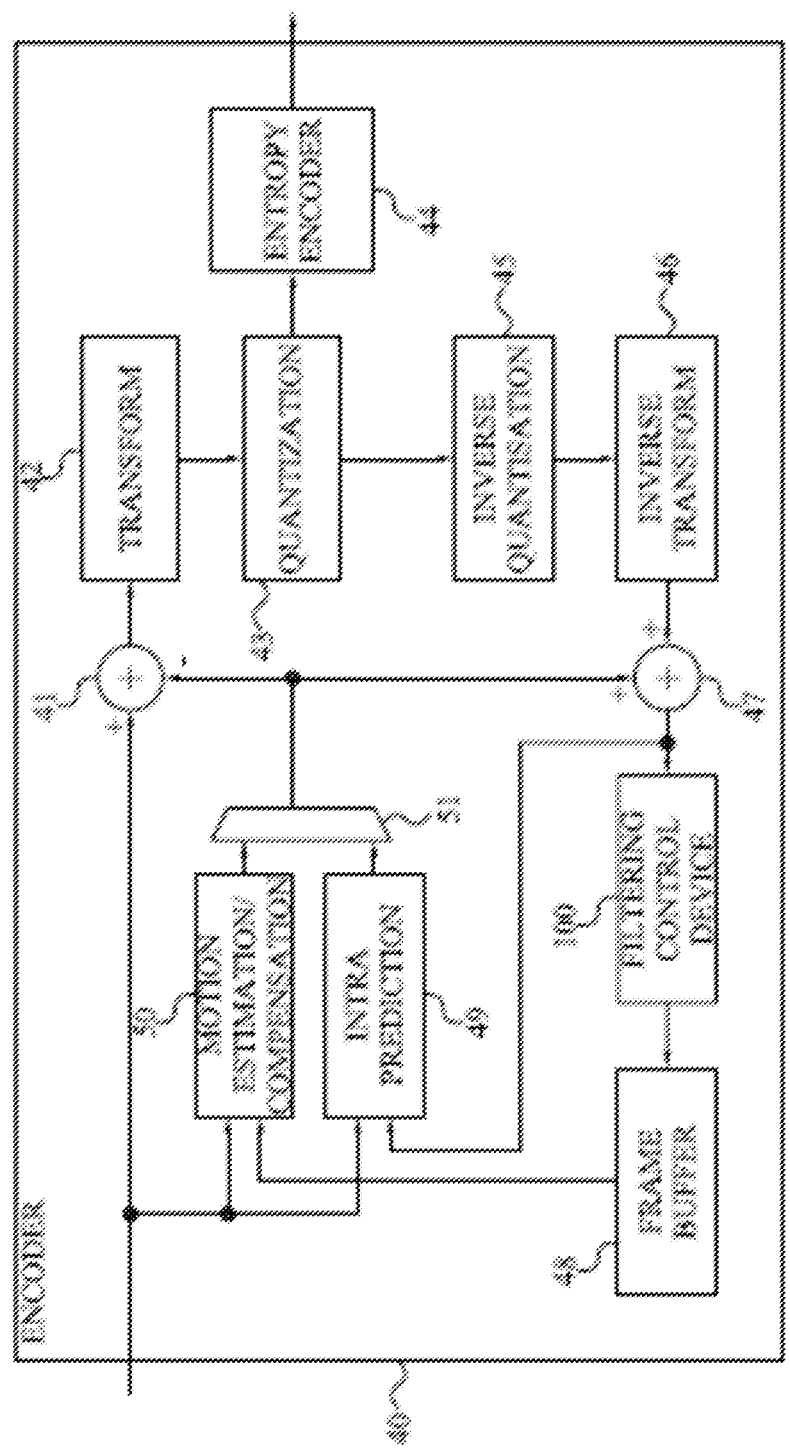
FIG. 2 is a schematic block diagram of an encoder according to an embodiment.
Figure 3:
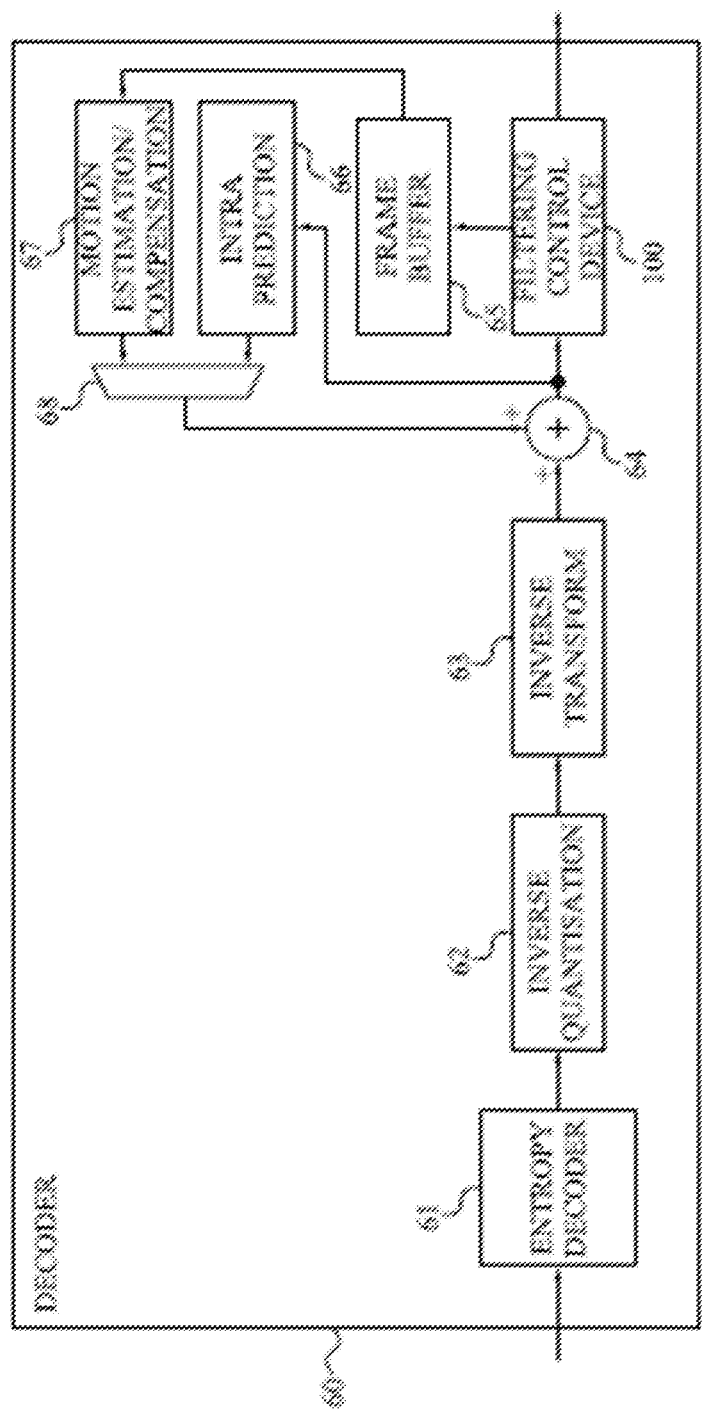
FIG. 3 is a schematic block diagram of a decoder according to an embodiment.

The methods of the embodiments are performed in a filtering control device which can be located in an encoder or a decoder as schematically illustrated in FIGS. 2 and 3. FIGS. 2 and 3 illustrate the example when the method is performed inside the coding loop.

The embodiments can be implemented in a filtering control device.

FIG. 2 is a schematic block diagram of an encoder 40 for encoding a block of pixels in a video frame of a video sequence according to an embodiment.

A current block of pixels is predicted by performing a motion estimation by a motion estimator 50 from an already provided block of pixels in the same frame or in a previous frame. The result of the motion estimation is a motion or displacement vector associated with the reference block, in the case of inter prediction. The motion vector is utilized by a motion compensator 50 for outputting an inter prediction of the block of pixels.

An intra predictor 49 computes an intra prediction of the current block of pixels. The outputs from the motion estimator/compensator 50 and the intra predictor 49 are input in a selector 51 that either selects intra prediction or inter prediction for the current block of pixels. The output from the selector 51 is input to an error calculator in the form of an adder 41 that also receives the pixel values of the current block of pixels. The adder 41 calculates and outputs a residual error as the difference in pixel values between the block of pixels and its prediction.

The error is transformed in a transformer 42, such as by a discrete cosine transform, and quantized by a quantizer 43 followed by coding in an encoder 44, such as by entropy encoder. In inter coding, also the estimated motion vector is brought to the encoder 44 for generating the coded representation of the current block of pixels.

The transformed and quantized residual error for the current block of pixels is also provided to an inverse quantizer 45 and inverse transformer 46 to retrieve the original residual error. This error is added by an adder 47 to the block prediction output from the motion compensator 50 or the intra predictor 49 to create a reference block of pixels that can be used in the prediction and coding of a next block of pixels. This new reference block is first processed by a filtering control device 100 in order to control any filtering that is applied to the reference block to combat any artifact. The processed new reference block is then temporarily stored in a frame buffer 48, where it is available to the intra predictor 49 and the motion estimator/compensator 50.

FIG. 3 is a corresponding schematic block diagram of a decoder 60 comprising a filtering control device 100 according to any of the embodiments or in combinations thereof. The decoder 60 comprises a decoder 61, such as entropy decoder, for decoding an encoded representation of a block of pixels to get a set of quantized and transformed residual errors. These residual errors are dequantized in an inverse quantizer 62 and inverse transformed by an inverse transformer 63 to get a set of residual errors.

These residual errors are added in an adder 64 to the pixel values of a reference block of pixels. The reference block is determined by a motion estimator/compensator 67 or intra predictor 66, depending on whether inter or intra prediction is performed. A selector 68 is thereby interconnected to the adder 64 and the motion estimator/compensator 67 and the intra predictor 66. The resulting decoded block of pixels output from the adder 64 is input to a filtering control device 100 in order to control any filter that is applied to combat any artifacts. The filtered block of pixels is output form the decoder 60 and is furthermore preferably temporarily provided to a frame buffer 65 and can be used as a reference block of pixels for a subsequent block of pixels to be decoded. The frame buffer 65 is thereby connected to the motion estimator/compensator 67 to make the stored blocks of pixels available to the motion estimator/compensator 67.

The output from the adder 64 is preferably also input to the intra predictor 66 to be used as an unfiltered reference block of pixels.

In the embodiments disclosed in FIGS. 2 and 3 the filtering control device 100 controls filtering in the form of so called in-loop filtering. In an alternative implementation at the decoder 60 the filtering control device 100 is arranged to perform so called post-processing filtering. In such a case, the filtering control device 100 operates on the output frames outside of the loop formed by the adder 64, the frame buffer 65, the intra predictor 66, the motion estimator/compensator 67 and the selector 68. No filtering and filter control is then typically done at the encoder.

The solution, including the embodiments above, applies to a decoder, an encoder, as an in-loop filter or as a post-processing filter. The encoder may for example be located in a transmitter in a video camera in e.g. a mobile device. The decoder may for example be located in a receiver in a video camera or any other device for displaying, decoding or transcoding a video stream.

The solution is not limited to HEVC but may be applied to any extension of HEVC such as a scalable extension or multiview extension or to a different video codec.

Figure 5:
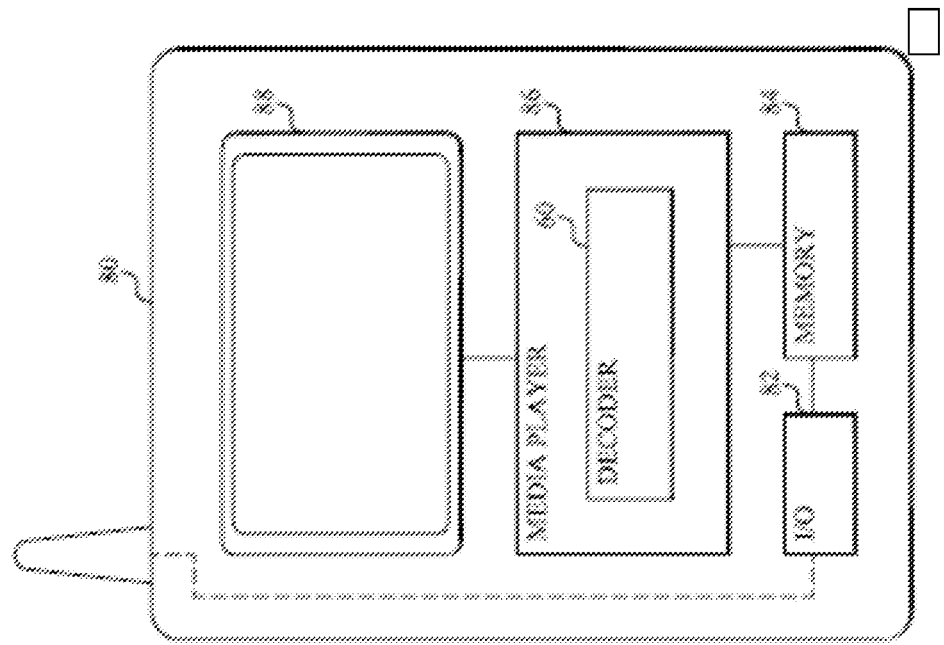
FIG. 5 is a schematic block diagram of a user equipment according to another embodiment.

FIG. 5 is a schematic block diagram of a user equipment or media terminal 80 housing a decoder 60 with a filtering control device. The user equipment 80 can be any device having media decoding functions that operates on an encoded video stream of encoded video frames to thereby decode the video frames and make the video data available. Non-limiting examples of such devices include mobile telephones and other portable media players, tablets, desktops, notebooks, personal video recorders, multimedia players, video streaming servers, set-top boxes, TVs, computers, decoders, game consoles, etc. The user equipment 80 comprises a memory 84 configured to store encoded video frames. These encoded video frames can have been generated by the user equipment 80 itself.

Alternatively, the encoded video frames are generated by some other device and wirelessly transmitted or transmitted by wire to the user equipment 80. The user equipment 80 then comprises a transceiver (transmitter and receiver) or input and output port 82 to achieve the data transfer.

In FIG. 5, the user equipment 80 has been illustrated as comprising both the decoder 60 and the media player 86, with the decoder 60 implemented as a part of the media player 86. This should, however, merely be seen as an illustrative but non-limiting example of an implementation embodiment for the user equipment 80. Also distributed implementations are possible where the decoder 60 and the media player 86 are provided in two physically separated devices are possible and within the scope of user equipment 80 as used herein. The display 88 could also be provided as a separate device connected to the user equipment 80, where the actual data processing is taking place.

Figure 4:
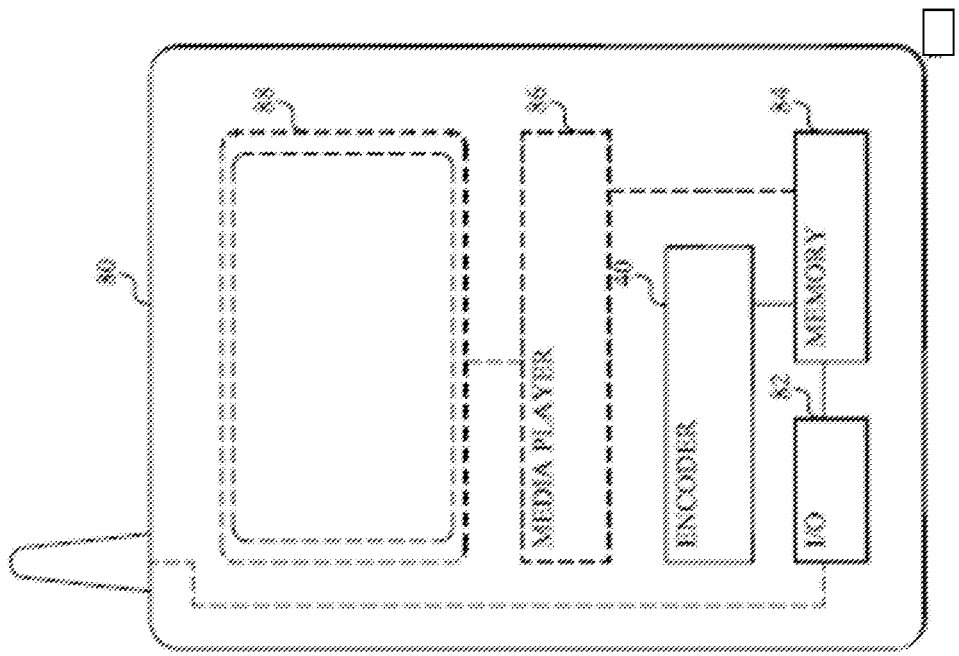
FIG. 4 is a schematic block diagram of a user equipment according to an embodiment.

FIG. 4 illustrates another embodiment of a user equipment 80 that comprises en encoder, such as the encoder of FIG. 2, comprising a filtering control device according to the embodiments. The encoder 40 is then configured to encode video frames received by the I/O unit 82 and/or generated by the user equipment 80 itself. In the latter case, the user equipment 80 preferably comprises a media engine or recorder, such as in the form of or connected to a (video) camera. The user equipment 80 may optionally also comprise a media player 86, such as a media player 86 with a decoder and filtering control device according to the embodiments, and a display 88.

The encoded video frames are brought from the memory 84 to a decoder 60, such as the decoder illustrated in FIG. 3. The decoder 60 comprises a filtering control device according to the embodiments. The decoder 60 then decodes the encoded video frames into decoded video frames. The decoded video frames are provided to a media player 86 that is configured to render the decoded video frames into video data that is displayable on a display or screen 88 of or connected to the user equipment 80.

An embodiment therefore relates to a media terminal 70, 80, 90 comprising a processing unit 72 and a memory 73 comprising code means executable by the processing unit 72. The media terminal 70, 80, 90 is thereby operative to filter pixel values of pixel in a line of pixels in a block of pixels with a strong deblocking filter to obtain filtered pixel values. The media terminal 70, 80, 90 is also operative to clip off, for each filtered pixel value of a pixel in the line of pixels, the filtered pixel value to a respective clipping parameter value defined based on a position of the pixel relative to a block boundary between the block of pixels and a neighboring block of pixels. The clipping parameter values change at least approximately linearly depending on the position of the pixel relative to the block boundary and pixels in the line of pixels having different positions from the block boundary have different clipping parameter values.

As illustrated in FIG. 6, the encoder 40 and/or decoder 60, such as illustrated in FIGS. 2 and 3, may be implemented in a network device 30 being or belonging to a network node in a communication network 32 between a sending unit 34 and a receiving user equipment 36. Such a network device 30 may be a device for converting video according to one video coding standard to another video coding standard, for example, if it has been established that the receiving user equipment 36 is only capable of or prefers another video coding standard than the one sent from the sending unit 34. The network device 30 can be in the form of or comprised in a radio base station, a Node-B or any other network node in a communication network 32, such as a radio-based network.

Figure 19:
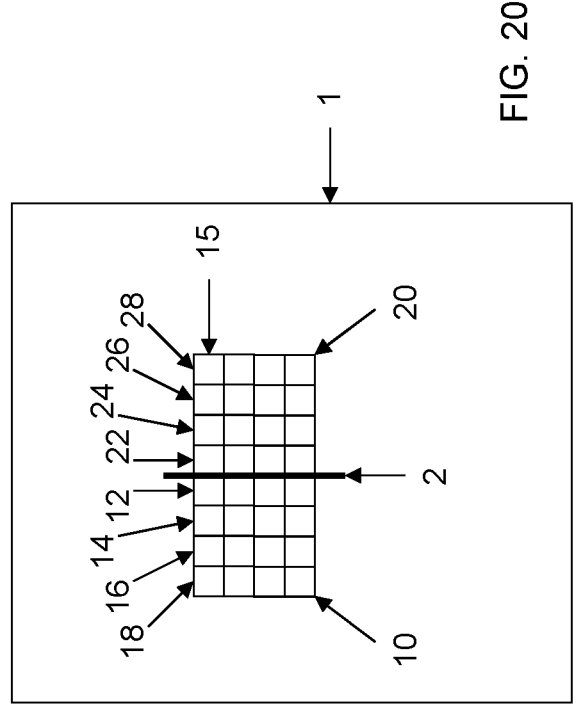
FIG. 19 is a schematic block diagram of a filtering control (ctrl) device according to yet another embodiment.

As was discussed in the foregoing, the new proposed strong deblocking filters that preserve a ramp signal and smooth a step signal can be used independent of the unequal clipping. FIG. 19 is a schematic block diagram of a filtering control (ctrl) device 100 according to such an embodiment. The filtering control device 100 comprises a filtering unit 101 configured to deblocking filter pixel values of pixels in a line of pixels in a block of pixels and in a neighboring block of pixels by calculating filtered pixel values according to:

$$p_0'=(p_2+2\times p_1+2\times p_0+2\times q_0+q_1+4)>>3$$

$$q_0'=(p_1+2\times p_0+2\times q_0+2\times q_1+q_2+4)>>3$$

$$p_1'=(p_3+2\times p_2+2\times p_1+p_0+2\times q_0+4)>>3$$

$$q_1'=(q_3+2\times q_2+2\times q_1+q_0+2\times p_0+4)>>3$$

$$p_2'=(3\times p_3+3\times p_2+p_1+q_0+4)>>3$$

$$q_2'=(p_0+q_1+3\times q_2+3\times q_3+4)>>3$$

In an alternative embodiment, the filtering unit 101 is configured to deblocking filter pixel values of pixels in a line of pixels in a block of pixels and in a neighboring block of pixels by calculating filtered pixel values according to:

$$p_0'=(p_2+2\times p_1+2\times p_0+2\times q_0+q_1+4)>>3$$

$$q_0'=(p_1+2\times p_0+2\times q_0+2\times q_1+q_2+4)>>3$$

$$p_1'=(p_3+3\times p_2+2\times p_1+q_0+q_1+4)>>3$$

$$q_1'=(q_3+3\times q_2+2\times q_1+p_0+p_1+4)>>3$$

$$p_2'=(3\times p_3+4\times p_2+q_0+4)>>3$$

$$q_2'=(p_0+4\times q_2+3\times q_3+4)>>3$$

In an alternative implementation example the filtering control device 100 is implemented as shown in FIG. 7. In such a case, the filtering control device 100 comprises a processing unit 120 configured to deblocking filter pixel values of pixels in a line of pixels in a block of pixels and in a neighboring block of pixels by calculating filtered pixel values according to:

$$p_0'=(p_2+2\times p_1+2\times p_0+2\times q_0+q_1+4)>>3$$

$$q_0'=(p_1+2\times p_0+2\times q_0+2\times q_1+q_2+4)>>3$$

$$p_1'=(p_3+2\times p_2+2\times p_1+p_0+2\times q_0+4)>>3$$

$$q_1'=(q_3+2\times q_2+2\times q_1+q_0+2\times p_0+4)>>3$$

$$p_2'=(3\times p_3+3\times p_2+p_1+q_0+4)>>3$$

$$q_2'=(p_0+q_1+3\times q_2+3\times q_3+4)>>3$$

In an alternative embodiment, the processing unit 120 is configured to deblocking filter pixel values of pixels in a line of pixels in a block of pixels and in a neighboring block of pixels by calculating filtered pixel values according to:

$$p_0'=(p_2+2\times p_1+2\times p_0+2\times q_0+q_1+4)>>3$$

$$q_0'=(p_1+2\times p_0+2\times q_0+2\times q_1+q_2+4)>>3$$

$$p_1'=(p_3+3\times p_2+2\times p_1+q_0+q_1+4)>>3$$

$$q_1'=(q_3+3\times q_2+2\times q_1+p_0+p_1+4)>>3$$

$$p_2'=(3\times p_3+4\times p_2+q_0+4)>>3$$

$$q_2'=(p_0+4\times q_2+3\times q_3+4)>>3$$

This aspect of the embodiments also encompasses an encoder comprising a filtering control device as defined above, a decoder comprising a filtering control device according to above and a user equipment comprising an encoder according to above and/or a decoder according to above. The embodiments also relates to a network device being or belonging to a network node in a communication network. The network device comprises an encoder according to above and/or a decoder according to above. The encoder, the decoder, the user equipment and the network device can then be implemented as discussed in the foregoing in connection with FIGS. 2-6.

The filtering control device applying the new strong deblocking filter can be implemented in hardware, software or a combination thereof as disclosed in the foregoing in connection with FIG. 8. Hence, an embodiment of this aspect relates to a computer program for strong deblocking filtering. The computer program comprises code means, which when executed by a processing unit, causes the processing unit to deblocking filter pixel values of pixels in a line of pixels in a block of pixels and in a neighboring block of pixels by calculating filtered pixel values according to:

$$p_0'=(p_2+2\times p_1+2\times p_0+2\times q_0+q_1+4)>>3$$

$$q_0'=(p_1+2\times p_0+2\times q_0+2\times q_1+q_2+4)>>3$$

$$p_1'=(p_3+2\times p_2+2\times p_1+p_0+2\times q_0+4)>>3$$

$$q_1'=(q_3+2\times q_2+2\times q_1+q_0+2\times p_0+4)>>3$$

$$p_2'=(3\times p_3+3\times p_2+p_1+q_0+4)>>3$$

$$q_2'=(p_0+q_1+3\times q_2+3\times q_3+4)>>3$$

In an alternative embodiment, the code means also causes the processing unit to deblocking filter pixel values of pixels in a line of pixels in a block of pixels and in a neighboring block of pixels by calculating filtered pixel values according to:

$$p_0'=(p_2+2\times p_1+2\times p_0+2\times q_0+q_1+4)>>3$$

$$q_0'=(p_1+2\times p_0+2\times q_0+2\times q_1+q_2+4)>>3$$

$p_1'=(p_3+3\times p_2+2\times p_1+q_0+q_1+4)>>3$ $q_1'=(q_3+3\times q_2+2\times q_1+p_0+p_1+4)>>3$ $p_2'=(3\times p_3+4\times p_2+q_0+4)>>3$ $q_2'=(p_0+4\times q_2+3\times q_3+4)>>3$ An embodiment of this aspect relates to a computer program product comprising computer readable code means a computer program according to above stored on the computer readable code means.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A filtering control method, the method being performed in a system comprising a memory and a processor, the method comprising:
   filtering pixel values of pixels in a line of pixels in a block of pixels with a strong deblocking filter to obtain filtered pixel values, the line of pixels comprising a first pixel, a second pixel, and a third pixel, the first pixel being closer to a block boundary than the second pixel, and the second pixel being closer to the block boundary than the third pixel; and
   for each filtered pixel value in said line of pixels:
      determining whether the filtered pixel is within a respective range defined from a minimum value, equal to the unfiltered pixel value minus a respective clipping parameter value for that pixel, to a maximum value, equal to the unfiltered pixel value plus the respective clipping parameter value, the clipping parameter value indicating a maximum permissible modification for that pixel; and
      upon determining that filtered pixel value exceeds the respective range, clipping off said filtered pixel value to a clipped filtered pixel value that is within the respective range;
   wherein the respective clipping parameter value is defined based on a position of said pixel relative to the block boundary between said block of pixels and a neighboring block of pixels; and
   wherein the clipping parameter values are defined to change at least approximately linearly with distance from the block boundary such that the third pixel in said line of pixels has a smaller clipping parameter value than the second pixel.

2. The filtering control method according to claim 1, further comprising defining said clipping parameter values to form a straight line depending on the distance from the block boundary of each respective first, second, and third pixels.

3. The filtering control method according to claim 1, wherein clipping off said filtered pixel value comprises calculating, for each filtered pixel value, a clipped filtered pixel value $x'=\text{Clip3}(A, B, x)$ defined as $x'=x$, or if $x<A$ then $x'=A$, or if $x>B$ then $x'=B$, wherein x denotes said filtered pixel value of said pixel, $A=p_x-tcX$ and $B=p_x+tcX$, $p_x$ denotes a pixel value of said pixel and tcX denotes said clipping parameter value for said pixel.

4. The filtering control method according to claim 1, further comprising calculating said clipping parameter values to be $(tc\times 3+1)>>1$ for the first pixel, relative to said block boundary, in said line of pixels, tc for the second pixel, relative to said block boundary, in said line of pixels and $(tc+1)>>1$ for the third pixel, relative to said block boundary, in said line of pixels, wherein tc is a parameter that depends on a quantization parameter value associated with said block of pixels and >> represents a right shift operator defined as $$a >> b = \left\lfloor \frac{a}{2^b} \right\rfloor$$

and $\lfloor c \rfloor$ is a largest integer not greater than c.

5. The filtering control method according to claim 1, further comprising calculating said clipping parameter values to be $tc1=((tc<<1)+tc+1)>>2$ for the second pixel, relative to said block boundary in said line of pixels, $(tc1\times 3+1)>>1$ for the first pixel, relative to said block boundary, in said line of pixels and $(tc1+1)>>1$ for the third pixel, relative to said block boundary, in said line of pixels, wherein tc is a parameter that depends on a quantization parameter value associated with said block of pixels and >> represents a right shift operator defined as $$a >> b = \left\lfloor \frac{a}{2^b} \right\rfloor$$

and $\lfloor c \rfloor$ is a largest integer not greater than c.

6. The filtering control method according to claim 1, wherein filtering said pixel values comprises calculating said filtered pixel values according to:

$p_0'=(p_2+2\times p_1+2\times p_0+2\times q_0+q_1+4)>>3$ $p_1'=(p_3+2\times p_2+2\times p_1+P+2\times q_0+4)>>3$ $p_2'=(3\times p_3+3\times p_2+p+q_0+4)>>3$ wherein $p_0$ represents a pixel value of the first pixel, relative to said block boundary, in said line of pixels in said block of pixels, $p_1$ represents a pixel value of the second pixel, relative to said block boundary, in said line of pixels in said block of pixels, $p_2$ represents a pixel value of the third pixel, relative to said block boundary, in said line of pixels in said block of pixels, $p_3$ represents a pixel value of a fourth pixel, relative to said block boundary, in said line of pixels in said block of pixels, $q_0$ represents a pixel value of the first pixel, relative to said block boundary, in said line of pixels in said neighboring block of pixels, $q_1$ represents a pixel value of the second pixel, relative to said block boundary, in said line of pixels in said neighboring block of pixels, $p_0'$ represents a filtered pixel value for said first pixel in said line of pixels in said block of pixels, $p_1'$ represents a filtered pixel value for said second pixel in said line of pixels in said block of pixels, $p_2'$ represents a filtered pixel value for said third pixel in said line of pixels in said block of pixels, and >> represents a right shift operator defined as $$a >> b = \left\lfloor \frac{a}{2^b} \right\rfloor$$

and $\lfloor c \rfloor$ is a largest integer not greater than c.

7. The filtering control method according to claim 1, wherein filtering said pixel values comprises calculating said filtered pixel values according to:

$p_0'=(p_2+2\times p_1+2\times p_0+2\times q_0+q_1+4)>>3$ $p_1'=(p_3+3\times p_2+2\times p_1+q_0+q_1+4)>>3$ $p_2'=(3\times p_3+4\times p_2+q_0+4)>>3$ wherein $p_0$ represents a pixel value of the first pixel, relative to said block boundary, in said line of pixels in said block of pixels, $p_1$ represents a pixel value of the second pixel, relative to said block boundary, in said line of pixels in said block of pixels, $p_2$ represents a pixel value of the third pixel, relative to said block boundary, in said line of pixels in said block of pixels, $p_3$ represents a pixel value of a fourth pixel, relative to said block boundary, in said line of pixels in said block of pixels, $q_0$ represents a pixel value of the first pixel, relative to said block boundary, in said line of pixels in said neighboring block of pixels, $q_1$ represents a pixel value of the second pixel, relative to said block boundary, in said line of pixels in said neighboring block of pixels, $p_0'$ represents a filtered pixel value for said first pixel in said line of pixels in said block of pixels, $p_1'$ represents a filtered pixel value for said second pixel in said line of pixels in said block of pixels, $p_2'$ represents a filtered pixel value for said third pixel in said line of pixels in said block of pixels, and >> represents a right shift operator defined as $$a >> b = \left\lfloor \frac{a}{2^b} \right\rfloor$$

and $\lfloor c \rfloor$ is a largest integer not greater than c.

8. The filtering control method according to claim 1, wherein filtering said pixel values comprises calculating said filtered pixel values according to:

$p_0'=(p_2+2\times p_1+2\times p_0+2\times q_0+q_1+4)>>3$ $p_1'=(p_2+p_1+p_0+q_0+2)>>2$ $p_2'=(2\times p_3+3\times p_2+p+p_0+q_0+4)>>3$ wherein $p_0$ represents a pixel value of the first pixel, relative to said block boundary, in said line of pixels in said block of pixels, $p_1$ represents a pixel value of the second pixel, relative to said block boundary, in said line of pixels in said block of pixels, $p_2$ represents a pixel value of the third pixel, relative to said block boundary, in said line of pixels in said block of pixels, $p_3$ represents a pixel value of a fourth pixel, relative to said block boundary, in said line of pixels in said block of pixels, $q_0$ represents a pixel value of the first pixel, relative to said block boundary, in said line of pixels in said neighboring block of pixels, $q_1$ represents a pixel value of the second pixel, relative to said block boundary, in said line of pixels in said neighboring block of pixels, $p_0'$ represents a filtered pixel value for said first pixel in said line of pixels in said block of pixels, $p_1'$ represents a filtered pixel value for said second pixel in said line of pixels in said block of pixels, $p_2'$ represents a filtered pixel value for said third pixel in said line of pixels in said block of pixels, and >> represents a right shift operator defined as $$a >> b = \left\lfloor \frac{a}{2^b} \right\rfloor$$

and $\lfloor c \rfloor$ is a largest integer not greater than c.

9. A filtering control device comprising:
a filtering unit configured to filter pixel values of pixels in a line of pixels in a block of pixels with a strong deblocking filter to obtain filtered pixel values, the line of pixels comprising a first pixel, a second pixel, and a third pixel, the first pixel being closer to a block boundary than the second pixel, and the second pixel being closer to the block boundary than the third pixel; and a clipping unit configured to, for each filtered pixel value in said line of pixels:
determine whether the filtered pixel is within a respective range defined from a minimum value, equal to the unfiltered pixel value minus a respective clipping parameter value for that pixel, to a maximum value, equal to the unfiltered pixel value plus the respective clipping parameter value, the clipping parameter value indicating a maximum permissible modification for that pixel; and
upon determining that the filtered pixel value exceeds the respective range, clip off said filtered pixel value to a clipped filtered pixel value that is within the respective range;
wherein the respective clipping parameter value is defined based on a position of said pixel relative to the block boundary between said block of pixels and a neighboring block of pixels; and
wherein the clipping parameter values are defined to change at least approximately linearly with distance from the block boundary such that the third pixel in said line of pixels has a smaller clipping parameter value than the second pixel.

10. A filtering control device comprising:
a processing unit comprising at least one processor; and
a memory comprising instructions executable by said processing unit, whereby said filtering control device is configured to:
filter pixel values of pixels in a line of pixels in a block of pixels with a strong deblocking filter to obtain filtered pixel values, the line of pixels comprising a first pixel, a second pixel, and a third pixel, the first pixel being closer to a block boundary than the second pixel, and the second pixel being closer to the block boundary than the third pixel; and
for each filtered pixel value in said line of pixels:
determine whether the filtered pixel is within a respective range defined from a minimum value, equal to the unfiltered pixel value minus a respective clipping parameter value for that pixel, to a maximum value, equal to the unfiltered pixel value plus the respective clipping parameter value, the clipping parameter value indicating a maximum permissible modification for that pixel; and
upon determining that the filtered pixel value exceeds the respective range, clip off said filtered pixel value to a clipped filtered pixel value that is within the respective range;
wherein the respective clipping parameter value is defined based on a position of said pixel relative to the block boundary between said block of pixels and a neighboring block of pixels; and wherein the clipping parameter values are defined to change at least approximately linearly with distance from the block boundary such that the third pixel in said line of pixels has a smaller clipping parameter value than the second pixel.

11. A computer program stored on a non-transitory computer-readable medium, said computer program comprising code which when executed by a processor causes said processor to:

filter pixel values of pixels in a line of pixels in a block of pixels with a strong deblocking filter to obtain filtered pixel values, the line of pixels comprising a first pixel, a second pixel, and a third pixel, the first pixel being closer to a block boundary than the second pixel, and the second pixel being closer to the block boundary than the third pixel; and for each filtered pixel value in said line of pixels:
determine whether the filtered pixel is within a respective range defined from a minimum value, equal to the unfiltered pixel value minus a respective clipping parameter value for that pixel, to a maximum value, equal to the unfiltered pixel value plus the respective clipping parameter value, the clipping parameter value indicating a maximum permissible modification for that pixel; and
upon determining that the filtered pixel value exceeds the respective range, clip off said filtered pixel value to a clipped filtered pixel value that is within the respective range;
wherein said respective clipping parameter value is defined based on a position of said pixel relative to the block boundary between said block of pixels and a neighboring block of pixels; and
wherein the clipping parameter values are defined to change at least approximately linearly with distance from the block boundary such that the third pixel in said line of pixels has a smaller clipping parameter value than the second pixel.

12. A computer program product stored on a non-transitory computer-readable medium, the computer program product comprising computer readable code means and a computer program according to claim 11 stored on said computer readable code means.

13. A filtering system comprising:
a processor; and
a memory comprising instructions executable by said processor, whereby said filtering system is operative to:
filter pixel values of pixels in a line of pixels in a block of pixels with a strong deblocking filter to obtain filtered pixel values, the line of pixels comprising a first pixel, a second pixel, and a third pixel, the first pixel being closer to a block boundary than the second pixel, and the second pixel being closer to the block boundary than the third pixel; and
for each filtered pixel value in said line of pixels:
determine whether the filtered pixel is within a respective range defined from a minimum value, equal to the unfiltered pixel value minus a respective clipping parameter value for that pixel, to a maximum value, equal to the unfiltered pixel value plus the respective clipping parameter value, the clipping parameter value indicating a maximum permissible modification for that pixel; and
upon determining that the filtered pixel value exceeds the respective range, clip off said filtered pixel value to a clipped filtered pixel value that is within the respective range;
wherein the respective clipping parameter value is defined based on a position of said pixel relative to the block boundary between said block of pixels and a neighboring block of pixels; and
wherein the clipping parameter values are defined to change at least approximately linearly with distance from the block boundary such that the third pixel in said line of pixels has a smaller clipping parameter value than the second pixel.

14. The filtering system according to claim 13, wherein said clipping parameter values form a straight line depending on a distance of said pixel from said block boundary.

15. The filtering system according to claim 13, wherein said filtering system is further configured to calculate, for each filtered pixel value, a clipped filtered pixel value $x'=\text{Clip3}(A, B, x)$ defined as $x'=x$, or if $x<A$ then $x'=A$, or if $x>B$ then $x'=B$, wherein x denotes said filtered pixel value of said pixel, $A=p_x-\text{tcX}$ and $B=p_x+\text{tcX}$, $p_x$ denotes a pixel value of said pixel and tcX denotes said clipping parameter value for said pixel.

16. The filtering system according to claim 13, wherein the system is further configured to calculate said clipping parameter values to be $(\text{tc}\times 3+1)>>1$ for the first pixel, relative to said block boundary, in said line of pixels, tc for the second pixel, relative to said block boundary, in said line of pixels and $(\text{tc}+1)>>1$ for the third pixel, relative to said block boundary, in said line of pixels, wherein tc is a parameter that depends on a quantization parameter value associated with said block of pixels and $>>$ represents a right shift operator defined as $$a >> b = \left\lfloor \frac{a}{2^b} \right\rfloor$$

and $\lfloor c \rfloor$ is a largest integer not greater than c.

17. The filtering system according to claim 13, wherein the system is further configured to calculate said clipping parameter values to be $\text{tc1}=((\text{tc}<<1)+\text{tc}+1)>>2$ for the second pixel, relative to said block boundary, in said line of pixels, $(\text{tc1}\times 3+1)>>1$ for the first pixel, relative to said block boundary, in said line of pixels and $(\text{tc1}+1)>>1$ for the third pixel, relative to said block boundary, in said line of pixels, wherein tc is a parameter that depends on a quantization parameter value associated with said block of pixels and $>>$ represents a right shift operator defined as $$a >> b = \left\lfloor \frac{a}{2^b} \right\rfloor$$

and $\lfloor c \rfloor$ is a largest integer not greater than c.

18. The filtering system according to claim 13, wherein said filtering system is further configured to calculate said filtered pixel values according to:

$p_0'=(p_2+2\times p_1+2\times p_0+2\times q_0+q_1+4)>>3$ $p_1'=(p_3+2\times p_2+2\times p_1+p_0+2\times q_0+4)>>3$ $p_2'=(3\times p_3+3\times p_2++q_0+4)>>3$ wherein $p_0$ represents a pixel value of the first pixel, relative to said block boundary, in said line of pixels in said block of pixels, $p_1$ represents a pixel value of the second pixel, relative to said block boundary, in said line of pixels in said block of pixels, $p_2$ represents a pixel value of the third pixel, relative to said block boundary, in said line of pixels in said block of pixels, $p_3$ represents a pixel value of a fourth pixel, relative to said block boundary, in said line of pixels in said block of pixels, $q_0$ represents a pixel value of the first pixel, relative to said block boundary, in said line of pixels in said neighboring block of pixels, $q_1$ represents a pixel value of the second pixel, relative to said block boundary, in said line of pixels in said neighboring block of pixels, $p_0'$ represents a filtered pixel value for said first pixel in said line of pixels in said block of pixels, $p_1'$ represents a filtered pixel value for said second pixel in said line of pixels in said block of pixels, $p_2'$ represents a filtered pixel value for said third pixel in said line of pixels in said block of pixels, and >> represents a right shift operator defined as $$a >> b = \left\lfloor \frac{a}{2^b} \right\rfloor$$

and $\lfloor c \rfloor$ is a largest integer not greater than c.

19. The filtering system according to claim 13, wherein said filtering system is further configured to calculate said filtered pixel values according to:

$p_0'=(p_2+2\times p_1+2\times p_0+2\times q_0+q_1+4)>>3$ $p_1'=(p_3+3\times p_2+2\times p_1+q_0+q_1+4)>>3$ $p_2'=(3\times p_3+4\times p_2+q_0+4)>>3$ wherein $p_0$ represents a pixel value of the first pixel, relative to said block boundary, in said line of pixels in said block of pixels, $p_1$ represents a pixel value of the second pixel, relative to said block boundary, in said line of pixels in said block of pixels, $p_2$ represents a pixel value of the third pixel, relative to said block boundary, in said line of pixels in said block of pixels, $p_3$ represents a pixel value of a fourth pixel, relative to said block boundary, in said line of pixels in said block of pixels, $q_0$ represents a pixel value of the first pixel, relative to said block boundary, in said line of pixels in said neighboring block of pixels, $q_1$ represents a pixel value of the second pixel, relative to said block boundary, in said line of pixels in said neighboring block of pixels, $p_0'$ represents a filtered pixel value for said first pixel in said line of pixels in said block of pixels, $p_1'$ represents a filtered pixel value for said second pixel in said line of pixels in said block of pixels, $p_2'$ represents a filtered pixel value for said third pixel in said line of pixels in said block of pixels, and >> represents a right shift operator defined as $$a >> b = \left\lfloor \frac{a}{2^b} \right\rfloor$$

and $\lfloor c \rfloor$ is a largest integer not greater than c.

20. The filtering system according to claim 13, wherein said filtering system is further configured to calculate said filtered pixel values according to:

$p_0'=(p_2+2\times p_1+2\times p_0+2\times q_0+q_1+4)>>3$ $p_1'=(p_2+p_1+p_1+q_0+2)>>2$ $p_2'=(2\times p_3+3\times p_2+p_1+p_0+q_0+4)>>3$ wherein $p_0$ represents a pixel value of the first pixel, relative to said block boundary, in said line of pixels in said block of pixels, $p_1$ represents a pixel value of the second pixel, relative to said block boundary, in said line of pixels in said block of pixels, $p_2$ represents a pixel value of the third pixel, relative to said block boundary, in said line of pixels in said block of pixels, $p_3$ represents a pixel value of a fourth pixel, relative to said block boundary, in said line of pixels in said block of pixels, $q_0$ represents a pixel value of the first pixel, relative to said block boundary, in said line of pixels in said neighboring block of pixels, $q_1$ represents a pixel value of the second pixel, relative to said block boundary, in said line of pixels in said neighboring block of pixels, $p_0'$ represents a filtered pixel value for said first pixel in said line of pixels in said block of pixels, $p_1'$ represents a filtered pixel value for said second pixel in said line of pixels in said block of pixels, $p_2'$ represents a filtered pixel value for said third pixel in said line of pixels in said block of pixels, and >> represents a right shift operator defined as $$a >> b = \left\lfloor \frac{a}{2^b} \right\rfloor$$

and $\lfloor c \rfloor$ is a largest integer not greater than c.

21. An encoder comprising a filtering system according to claim 13.

22. A network node in a communication network, said network node comprising an encoder according to claim 21.

23. A decoder comprising a filtering system according to claim 13.

24. A user equipment comprising a decoder according to claim 23.

25. The method of claim 1, further wherein each of the respective clipping parameter values for the first, second, and third pixels are calculated using a quantization parameter value associated with said block of pixels.

* * * * *